(12) United States Patent
Yamada et al.

(10) Patent No.: US 12,534,584 B2
(45) Date of Patent: Jan. 27, 2026

(54) RESIN COMPOSITION, PREPREG, RESIN-ATTACHED FILM, RESIN-ATTACHED METAL FOIL, METAL-CLADDED LAMINATE SHEET, AND WIRING BOARD

(71) Applicant: PANASONIC INTELLECTUAL PROPERTY MANAGEMENT CO., LTD., Osaka (JP)

(72) Inventors: Takahiro Yamada, Fukushima (JP); Hiroyuki Fujisawa, Fukushima (JP); Yuji Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 654 days.

(21) Appl. No.: 17/621,148

(22) PCT Filed: Jun. 15, 2020

(86) PCT No.: PCT/JP2020/023471
§ 371 (c)(1),
(2) Date: Dec. 20, 2021

(87) PCT Pub. No.: WO2020/262089
PCT Pub. Date: Dec. 30, 2020

(65) Prior Publication Data
US 2022/0363798 A1    Nov. 17, 2022

(30) Foreign Application Priority Data
Jun. 27, 2019  (JP) ................. 2019-120081

(51) Int. Cl.
| | |
|---|---|
| C08J 5/24 | (2006.01) |
| B32B 15/08 | (2006.01) |
| B32B 27/26 | (2006.01) |
| C08F 222/10 | (2006.01) |
| C08F 290/06 | (2006.01) |
| C08G 61/10 | (2006.01) |
| C08G 65/38 | (2006.01) |
| C08K 5/13 | (2006.01) |
| C08K 5/3415 | (2006.01) |
| C08K 5/3492 | (2006.01) |
| C08K 5/5313 | (2006.01) |
| C08K 5/5397 | (2006.01) |

(52) U.S. Cl.
CPC ............. *C08J 5/244* (2021.05); *B32B 15/08* (2013.01); *B32B 27/26* (2013.01); *C08F 222/102* (2020.02); *C08F 290/062* (2013.01); *C08G 61/10* (2013.01); *C08G 65/38* (2013.01); *C08K 5/13* (2013.01); *C08K 5/3415* (2013.01); *C08K 5/34924* (2013.01); *C08K 5/5313* (2013.01); *C08K 5/5397* (2013.01); *B32B 2255/06* (2013.01); *B32B 2260/046* (2013.01); *B32B 2262/101* (2013.01); *B32B 2307/206* (2013.01); *B32B 2307/3065* (2013.01); *B32B 2311/12* (2013.01); *B32B 2311/24* (2013.01); *B32B 2457/08* (2013.01); *C08F 2810/40* (2013.01); *C08G 2261/143* (2013.01); *C08G 2261/77* (2013.01)

(58) Field of Classification Search
CPC ... C08G 65/485; C08F 290/062; C08L 71/12; C08L 71/123; C08L 71/126; C08K 5/5397; C08K 5/5313
See application file for complete search history.

(56) References Cited

U.S. PATENT DOCUMENTS

| | | | |
|---|---|---|---|
| 2008/0300350 A1 | 12/2008 | Ohno et al. | |
| 2017/0313854 A1 | 11/2017 | Kobayashi et al. | |
| 2020/0001573 A1 | 1/2020 | Saito et al. | |
| 2020/0247972 A1 | 8/2020 | Sato et al. | |
| 2021/0032404 A1* | 2/2021 | Shigaki | B32B 15/20 |

FOREIGN PATENT DOCUMENTS

| | | |
|---|---|---|
| EP | 3 564 247 | 11/2019 |
| JP | 2002-308948 | 10/2002 |
| JP | 2007-191675 | 8/2007 |
| JP | 2009-161725 | 7/2009 |
| JP | 2018-135447 A | 8/2018 |
| WO | 2016/072404 A1 | 5/2016 |

(Continued)

OTHER PUBLICATIONS

JP2002308948 machine translation (Year: 2024).*

(Continued)

*Primary Examiner* — Jeffrey S Lenihan
(74) *Attorney, Agent, or Firm* — GREENBLUM & BERNSTEIN, P.L.C.

(57) ABSTRACT

A resin composition is provided and contains a maleimide compound, a polyphenylene ether compound having an unsaturated double bond in the molecule, a phosphorus-containing compound having a group represented by the following Formula (1) and a group containing a phosphorus atom in the molecule, and a curing agent.

[Chem. 1]

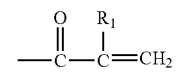

(1)

In Formula (1), $R_1$ represents a hydrogen atom or an alkyl group.

8 Claims, 5 Drawing Sheets

(56) References Cited

FOREIGN PATENT DOCUMENTS

| | | | |
|---|---|---|---|
| WO | 2018/124205 | 7/2018 | |
| WO | 2018/159080 | 9/2018 | |
| WO | 2019/065941 A1 | 4/2019 | |
| WO | WO-2019138992 A1 * | 7/2019 | ............. B32B 15/08 |

OTHER PUBLICATIONS

JP2007191675 machine translation (Year: 2024).*
Official Communication issued in International Bureau of WIPO Patent Application No. PCT/JP2020/023471, dated Aug. 25, 2020, along with an English translation thereof.

* cited by examiner

RESIN COMPOSITION, PREPREG, RESIN-ATTACHED FILM, RESIN-ATTACHED METAL FOIL, METAL-CLADDED LAMINATE SHEET, AND WIRING BOARD

TECHNICAL FIELD

The present invention relates to a resin composition, a prepreg, a film with resin, a metal foil with resin, a metal-clad laminate, and a wiring board.

BACKGROUND ART

As the information processing quantity by various kinds of electronic equipment increases, mounting technologies such as high integration of semiconductor devices to be mounted, densification of wiring, and multi-layering are progressing. In addition, wiring boards to be used in various kinds of electronic equipment are required to be, for example, high-frequency compatible wiring boards such as a millimeter-wave radar board for in-vehicle use. Substrate materials for forming insulating layers of wiring boards to be used in various kinds of electronic equipment are required to have a low dielectric constant and a low dielectric loss tangent in order to increase the signal transmission speed and to decrease the signal transmission loss.

It is known that polyphenylene ether exhibits excellent low dielectric properties such as a low dielectric constant and a low dielectric loss tangent and exhibits excellent low dielectric properties such as a low dielectric constant and a low dielectric loss tangent even in a high frequency band (high frequency region) from the MHz band to the GHz band. For this reason, it has been investigated that polyphenylene ether is used, for example, as a high frequency molding material. More specifically, polyphenylene ether is preferably used as a substrate material for forming an insulating layer of a wiring board to be equipped in electronic equipment utilizing a high frequency band.

The substrate material for forming an insulating layer of a wiring board is required not only to exhibit excellent low dielectric properties but also to exhibit improved curability and to provide a cured product exhibiting excellent heat resistance and the like. For this, it is conceivable to enhance the heat resistance by using a polyphenylene ether compound having an unsaturated double bond in the molecule as a substrate material. Examples of a resin composition containing such a polyphenylene ether compound having an unsaturated double bond in the molecule include the resin composition described in Patent Literature 1.

Patent Literature 1 describes a curable resin composition containing a vinyl compound having a polyphenylene ether skeleton in the molecule and a maleimide compound having a predetermined structure. Patent Literature 1 discloses that a curable resin composition can be obtained which provides a cured product having a low dielectric constant, a low dielectric loss tangent, and excellent heat resistance, mechanical properties, chemical resistance, and flame retardancy, exhibits excellent curability even in the presence of oxygen, and is curable at a low temperature.

CITATION LIST

Patent Literature

Patent Literature 1: JP 2009-161725 A

SUMMARY OF INVENTION

An object of the present invention is to provide a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. Another object of the present invention is to provide a prepreg, a film with resin, a metal foil with resin, a metal-clad laminate, and a wiring board which are obtained using the resin composition.

An aspect of the present invention is a resin composition containing a maleimide compound, a polyphenylene ether compound having an unsaturated double bond in the molecule, a phosphorus-containing compound having a group represented by the following Formula (1) and a group containing a phosphorus atom in the molecule, and a curing agent.

[Chem. 1]

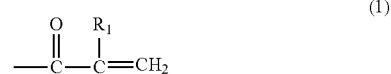

In Formula (1), $R_1$ represents a hydrogen atom or an alkyl group.

DESCRIPTION OF EMBODIMENTS

Figure 1:
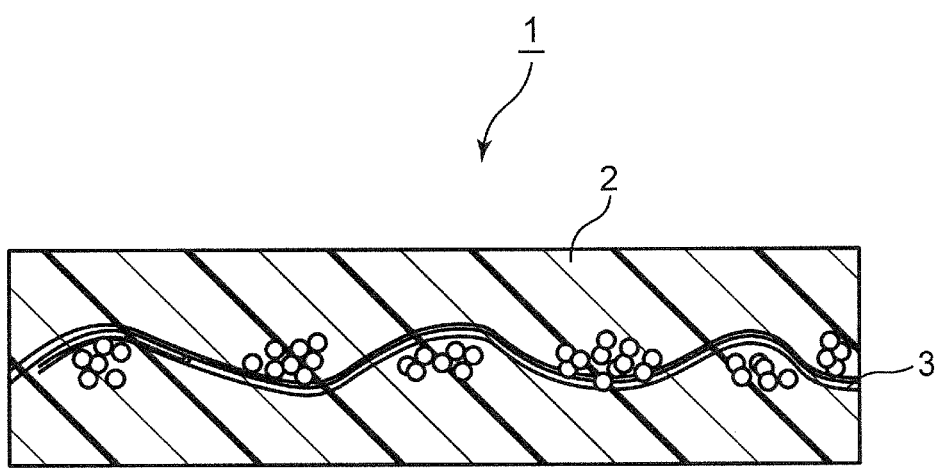
FIG. 1 is a schematic sectional view illustrating an example of a prepreg according to an embodiment of the present invention.

Wiring boards to be used in various kinds of electronic equipment are required to be hardly affected by changes in the external environment and the like. Substrate materials for forming insulating layers of wiring boards are required to provide a cured product having low water absorbing property, for example, so that the wiring boards can be used even in an environment in which the humidity is high. It is considered that it is possible to suppress moisture absorption in the insulating layer of a wiring board obtained from such a substrate material which provides a cured product having low water absorbing property. In addition, insulating layers of wiring boards are also required to suitably maintain low dielectric properties even if water is absorbed. For these reasons, substrate materials for forming insulating layers of wiring boards are required to provide a cured product which has low water absorbing property and can suitably maintain low dielectric properties even after water absorption. In other words, substrate materials for forming insulating layers of wiring boards are required to provide a cured product having sufficiently suppressed increases in dielectric constant and dielectric loss tangent due to water absorption. Substrate materials for forming insulating layers of wiring boards are required to provide a cured product exhibiting excellent heat resistance such as a high glass transition temperature, for example, so that the wiring boards can be used even in an environment in which the temperature is relatively high. Insulating layers equipped on wiring boards are also required not to be deformed even in an environment in which the temperature is relatively high. This deformation is suppressed when the glass transition temperature of the insulating layer is high, and thus substrate materials for forming insulating layers of wiring boards are required to have a high glass transition temperature. Insulating layers of wiring boards are also required to exhibit excellent flame retardancy from the viewpoint of fire prevention and the like. Hence, substrate materials for forming insulating layers of wiring boards are required to provide a cured product exhibiting excellent flame retardancy.

As described above, the demand for various properties of substrate materials for forming insulating layers of wiring boards is further increasing in order to cope with the further development of mounting technology such as high integration of semiconductor devices, high density of wiring, and multi-layering. Substrate materials are also required to exhibit excellent moldability in order to suitably form insulating layers of wiring boards while satisfying such a demand.

As a result of various studies, the present inventors have found out that the above object to provide a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption can be achieved by the present invention described below.

Hereinafter, embodiments according to the present invention will be described, but the present invention is not limited thereto.

[Resin Composition]

The resin composition according to the present embodiment contains a maleimide compound, a polyphenylene ether compound having an unsaturated double bond in the molecule, a phosphorus-containing compound having a group represented by the following Formula (1) and a group containing a phosphorus atom in the molecule, and a curing agent.

[Chem. 2]

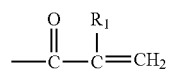

(1)

In Formula (1), $R_1$ represents a hydrogen atom or an alkyl group.

First, it is considered that a cured product, which maintains the excellent low dielectric properties of polyphenylene ether, is obtained by curing the resin composition since the resin composition contains the polyphenylene ether compound. It is considered that as the resin composition contains the polyphenylene ether compound, the maleimide compound, and the curing agent, the resin composition can be suitably cured and a cured product is obtained which has a high glass transition temperature, low water absorbing property, and sufficiently suppressed increases in the dielectric constant and dielectric loss tangent due to water absorption even after water absorption. In other words, it is considered that the resin composition can provide a cured product, which can suitably maintain the excellent low dielectric properties of the polyphenylene ether even after water absorption. It is considered that the phosphorus-containing compound has not only a group containing a phosphorus atom but also a group represented by Formula (1) in the molecule, and can be thus bonded to the polyphenylene ether compound and the like when the resin composition is cured. It is considered that this makes it possible to effectively enhance the flame retardancy of the cured product. Hence, it is considered that the flame retardancy of the cured product can be sufficiently enhanced while the deterioration of the moldability of the resin composition is suppressed with the phosphorus-containing compound since the flame retardancy can be enhanced with a relatively small amount of the phosphorus-containing compound.

From the above, the resin composition having the above configuration is a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption.

When a wiring board is manufactured using such a resin composition, there is obtained a wiring board including an insulating layer suitably formed of a cured product having a high glass transition temperature, excellent flame retardancy, low water absorbing property, and sufficiently suppressed increases in dielectric constant and dielectric loss tangent due to water absorption even after water absorption. For this reason, the wiring board includes, for example, an insulating layer having low water absorbing property and sufficiently suppressed increases in dielectric constant and dielectric loss tangent due to water absorption even after water absorption, and can be thus used even in an environment in which the humidity is high. There is obtained a wiring board including an insulating layer having a high glass transition temperature. For this reason, not only the heat resistance of the insulating layer is high but also the deformation of the insulating layer can be sufficiently suppressed, and the wiring board can be thus used even in an environment in which the temperature is high. When such a wiring board is, for example, a multilayer wiring board, deformation of the wiring board during the reflow cycle process of mounting parts on the multilayer wiring board can be sufficiently suppressed. In order to sufficiently suppress this deformation, the glass transition temperature is preferably 260° C. or more. By suppressing the deformation here, for example, it is possible to suppress the warp of the wiring board due to the temperature change in the reflow process. It is possible to suppress the occurrence of poor mounting of parts on the multilayer wiring board, cracks in conductive vias in the multilayer wiring board, poor connection at the interlayer vias in the multilayer wiring board, and the like. There is obtained a wiring board including an insulating layer exhibiting excellent flame retardancy. Since the resin composition exhibits excellent moldability, a wiring board as described above can be suitably manufactured.
(Maleimide Compound)

The maleimide compound is not particularly limited as long as it is a maleimide compound having a maleimide group in the molecule. Examples of the maleimide compound include a monofunctional maleimide compound having one maleimide group in the molecule and a polyfunctional maleimide compound having two or more maleimide groups in the molecule. Examples of the monofunctional maleimide compound include chlorophenylmaleimide such as o-chlorophenylmaleimide, methylphenylmaleimide such as o-methylphenylmaleimide, hydroxyphenylmaleimide such as p-hydroxyphenylmaleimide, carboxyphenylmaleimide such as p-carboxyphenylmaleimide, N-dodecylmaleimide, and phenylmethanemaleimide. Examples of the polyfunctional maleimide compound include phenylene bis-maleimides such as 4,4'-diphenylmethane bismaleimide, polyphenylmethane maleimide, and m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6'-bismaleimide-(2,2,4-trimethyl)hexane, 4,4'-diphenyl ether bismaleimide, 4,4'-diphenylsulphon bismaleimide, 1,3-bis(3-maleimide phenoxy)benzene, 1,3-bis(4-maleimide phenoxy)benzene, and a maleimide compound represented by the following Formula (3). Among these, the maleimide compound is preferably a maleimide compound represented by the following Formula (3) and polyphenylmethane maleimide. The maleimide compound may be used singly or in combination of two or more kinds thereof.

[Chem. 3]

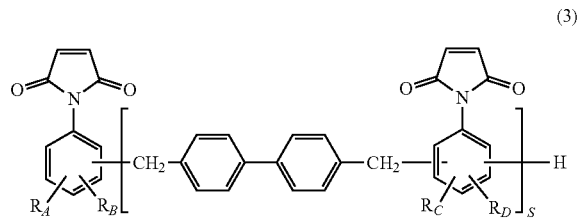

(3)

In Formula (3), s represents 1 to 5 and $R_A$, $R_B$, $R_C$, and $R_D$ each independently represent a hydrogen atom, an alkyl group having 1 to 5 carbon atoms, or a phenyl group.

In the maleimide compound represented by Formula (3), the number of repetitions s is preferably 1 to 5, preferably more than 1 and 5 or less. This s is an average value of the number of repetitions (degree of polymerization). $R_A$, $R_B$, $R_C$, and $R_D$ may be the same group as or different groups from each other. As described above, $R_A$, $R_B$, $R_C$, and $R_D$ represent a hydrogen atom, an alkyl group having 1 to 5 carbon atoms, or a phenyl group, and are preferably a hydrogen atom among these. Examples of the alkyl group having 1 to 5 carbon atoms include a methyl group, an ethyl group, a propyl group, an isopropyl group, an n-butyl group, a sec-butyl group, an isobutyl group, a tert-butyl group, a pentyl group, and a neopentyl group.

The molecular weight, specifically, the number average molecular weight of the maleimide compound represented by Formula (3) is preferably 150 to 2000, more preferably 400 to 1300. In addition, the weight average molecular weight is preferably 150 to 2500, more preferably 400 to 1500. The content of a bifunctional form represented by Formula (3), where s is 1, of the maleimide compound represented by Formula (3) is preferably 30% to 70% by mass, preferably 50% to 70% by mass. The content of a polyfunctional form of a trifunctional or higher form represented by Formula (3), where s is 2 or more, is preferably 30% to 70% by mass, preferably 30% to 50% by mass. When s that is the average value of the number of repetitions (degree of polymerization) is 1 to 5, the maleimide compound represented by Formula (3) may include a monofunctional form represented by Formula (3), where s is 0, or a polyfunctional form of a heptafunctional or octafunctional form represented by Formula (3), where s is 6 or more.

(Polyphenylene Ether Compound)

The polyphenylene ether compound is not particularly limited as long as it is a polyphenylene ether compound having an unsaturated double bond in the molecule. Examples of the polyphenylene ether compound include a polyphenylene ether compound having a substituent having an unsaturated double bond at the molecular terminal such as a modified polyphenylene ether compound of which the terminal is modified with a substituent having an unsaturated double bond.

The substituent having an unsaturated double bond is not particularly limited. Examples of the substituent include a substituent represented by the following Formula (4) and a substituent represented by the following Formula (5).

[Chem. 4]

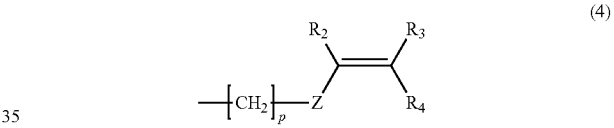

(4)

In Formula (4), p represents an integer 0 to 10. In addition, Z represents an arylene group. $R_2$ to $R_4$ are independent of each other. In other words, $R_2$ to $R_4$ may be the same group as or different groups from each other. $R_2$ to $R_4$ represent a hydrogen atom or an alkyl group.

In a case where p in Formula (4) is 0, it indicates that Z is directly bonded to the terminal of polyphenylene ether.

This arylene group is not particularly limited. Examples of this arylene group include a monocyclic aromatic group such as a phenylene group, and a polycyclic aromatic group in which the aromatic is not a single ring but a polycyclic aromatic such as a naphthalene ring. In addition, this arylene group also includes a derivative in which a hydrogen atom bonded to an aromatic ring is substituted with a functional group such as an alkenyl group, an alkynyl group, a formyl group, an alkylcarbonyl group, an alkenylcarbonyl group, or an alkynylcarbonyl group. In addition, the alkyl group is not particularly limited and is, for example, preferably an alkyl group having 1 to 18 carbon atoms and more preferably an alkyl group having 1 to 10 carbon atoms. Specific examples thereof include a methyl group, an ethyl group, a propyl group, a hexyl group, and a decyl group.

[Chem. 5]

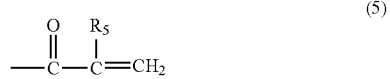

(5)

In Formula (5), $R_5$ represents a hydrogen atom or an alkyl group. The alkyl group is not particularly limited and is, for example, preferably an alkyl group having 1 to 18 carbon atoms and more preferably an alkyl group having 1 to 10 carbon atoms. Specific examples thereof include a methyl group, an ethyl group, a propyl group, a hexyl group, and a decyl group.

Preferred specific examples of the substituent represented by Formula (4) include, for example, a substituent having a vinylbenzyl group. Examples of the substituent having a vinylbenzyl group include a substituent represented by the following Formula (6). Examples of the substituent represented by Formula (5) include an acryloyl group and a methacryloyl group.

[Chem. 6]

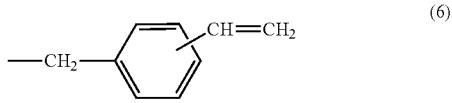

(6)

More specific examples of the substituent include vinylbenzyl groups (ethenylbenzyl groups) such as an o-ethenylbenzyl group, a p-ethenylbenzyl group, and an m-ethenylbenzyl group, a vinylphenyl group, an acryloyl group, and a methacryloyl group. The polyphenylene ether compound may have one kind of substituent or two or more kinds of substituents as the substituent. The polyphenylene ether compound may have, for example, any of an o-ethenylbenzyl group, a p-ethenylbenzyl group, or an m-ethenylbenzyl group or two or three kinds thereof.

The polyphenylene ether compound has a polyphenylene ether chain in the molecule and preferably has, for example, a repeating unit represented by the following Formula (7) in the molecule.

[Chem. 7]

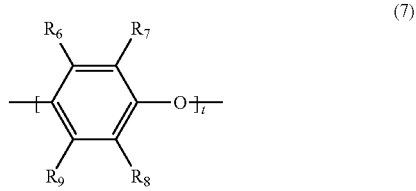

(7)

In Formula (7), t represents 1 to 50. $R_6$ to $R_9$ are independent of each other. In other words, $R_6$ to $R_9$ may be the same group as or different groups from each other. $R_6$ to $R_9$ represent a hydrogen atom, an alkyl group, an alkenyl group, an alkynyl group, a formyl group, an alkylcarbonyl group, an alkenylcarbonyl group, or an alkynylcarbonyl group. Among these, a hydrogen atom and an alkyl group are preferable.

Specific examples of the respective functional groups mentioned in $R_6$ to $R_9$ include the following.

The alkyl group is not particularly limited and is, for example, preferably an alkyl group having 1 to 18 carbon atoms and more preferably an alkyl group having 1 to 10 carbon atoms. Specific examples thereof include a methyl group, an ethyl group, a propyl group, a hexyl group, and a decyl group.

The alkenyl group is not particularly limited and is, for example, preferably an alkenyl group having 2 to 18 carbon atoms and more preferably an alkenyl group having 2 to 10 carbon atoms. Specific examples thereof include a vinyl group, an allyl group, and a 3-butenyl group.

The alkynyl group is not particularly limited and is, for example, preferably an alkynyl group having 2 to 18 carbon atoms and more preferably an alkynyl group having 2 to 10 carbon atoms. Specific examples thereof include an ethynyl group and a prop-2-yn-1-yl group (propargyl group).

The alkylcarbonyl group is not particularly limited as long as it is a carbonyl group substituted with an alkyl group and is, for example, preferably an alkylcarbonyl group having 2 to 18 carbon atoms and more preferably an alkylcarbonyl group having 2 to 10 carbon atoms. Specific examples thereof include an acetyl group, a propionyl group, a butyryl group, an isobutyryl group, a pivaloyl group, a hexanoyl group, an octanoyl group, and a cyclohexylcarbonyl group.

The alkenylcarbonyl group is not particularly limited as long as it is a carbonyl group substituted with an alkenyl group and is, for example, preferably an alkenylcarbonyl group having 3 to 18 carbon atoms and more preferably an alkenylcarbonyl group having 3 to 10 carbon atoms. Specific examples thereof include an acryloyl group, a methacryloyl group, and a crotonoyl group.

The alkynylcarbonyl group is not particularly limited as long as it is a carbonyl group substituted with an alkynyl group and is, for example, preferably an alkynylcarbonyl group having 3 to 18 carbon atoms and more preferably an alkynylcarbonyl group having 3 to 10 carbon atoms. Specific examples thereof include a propioloyl group.

The weight average molecular weight (Mw) of the polyphenylene ether compound is not particularly limited. Specifically, the weight average molecular weight is preferably 500 to 5000, more preferably 800 to 4000, and still more preferably 1000 to 3000. Note that the weight average molecular weight here may be measured by a general molecular weight measurement method, and specific examples thereof include a value measured by gel permeation chromatography (GPC). In a case where the polyphenylene ether compound has a repeating unit represented by Formula (7) in the molecule, t is preferably a numerical value so that the weight average molecular weight of the polyphenylene ether compound is in such a range. Specifically, t is preferably 1 to 50.

When the weight average molecular weight of the polyphenylene ether compound is in such a range, the polyphenylene ether compound exhibits the excellent low dielectric properties of polyphenylene ether and not only imparts superior heat resistance to the cured product but also exhibits excellent moldability. This is considered to be due to the following. When the weight average molecular weight of ordinary polyphenylene ether is in such a range, the heat resistance of the cured product tends to decrease since the molecular weight is relatively low. With regard to this point, it is considered that since the polyphenylene ether compound according to the present embodiment has an unsaturated double bond at the terminal, a cured product exhibiting sufficiently high heat resistance is obtained. When the weight average molecular weight of the polyphenylene ether compound is in such a range, the polyphenylene ether compound has a relatively low molecular weight and is thus considered to exhibit excellent moldability. Hence, it is considered that such a polyphenylene ether compound not only imparts superior heat resistance to the cured product but also exhibits excellent moldability.

In the polyphenylene ether compound, the average number of the substituents (number of terminal functional groups) at the molecule terminal per one molecule of the polyphenylene ether compound is not particularly limited. Specifically, the average number is preferably 1 to 5, more preferably 1 to 3, and still more preferably 1.5 to 3. When the number of terminal functional groups is too small, sufficient heat resistance of the cured product tends to be hardly attained. In addition, when the number of terminal functional groups is too large, the reactivity is too high and, for example, troubles such as deterioration in the storage stability of the resin composition or deterioration in the fluidity of the resin composition may occur. In other words, when such a polyphenylene ether compound is used, for example, molding defects such as generation of voids at the time of multilayer molding occur by insufficient fluidity and the like and a problem of moldability that a highly reliable printed wiring board is hardly obtained may occur.

The number of terminal functional groups in the polyphenylene ether compound includes a numerical value expressing the average value of the substituents per one molecule of all the polyphenylene ether compounds present in 1 mole of the polyphenylene ether compound. This number of terminal functional groups can be determined by, for example, measuring the number of hydroxyl groups remaining in the obtained polyphenylene ether compound and calculating the number of hydroxyl groups decreased from the number of hydroxyl groups in the polyphenylene ether before having (before being modified with) the substituent. The number of hydroxyl groups decreased from the number of hydroxyl groups in the polyphenylene ether before being modified is the number of terminal functional groups. Moreover, with regard to the method for measuring the number of hydroxyl groups remaining in the polyphenylene ether compound, the number of hydroxyl groups can be determined by adding a quaternary ammonium salt (tetraethylammonium hydroxide) to be associated with a hydroxyl group to a solution of the polyphenylene ether compound and measuring the UV absorbance of the mixed solution.

The intrinsic viscosity of the polyphenylene ether compound is not particularly limited. Specifically, the intrinsic viscosity is preferably 0.03 to 0.12 dl/g, more preferably 0.04 to 0.11 dl/g, still more preferably 0.06 to 0.095 dl/g. When the intrinsic viscosity is too low, the molecular weight tends to be low and low dielectric properties such as a low dielectric constant and a low dielectric loss tangent tend to be hardly attained. In addition, when the intrinsic viscosity is too high, the viscosity is high, sufficient fluidity is not attained, and the moldability of the cured product tends to deteriorate. Hence, when the intrinsic viscosity of the polyphenylene ether compound is in the above range, excellent heat resistance and moldability of the cured product can be realized.

Note that the intrinsic viscosity here is an intrinsic viscosity measured in methylene chloride at 25° C. and more specifically is, for example, a value attained by measuring the intrinsic viscosity of a methylene chloride solution (liquid temperature: 25° C.) at 0.18 g/45 ml using a viscometer. Examples of the viscometer include AVS500 Visco System manufactured by SCHOTT Instruments GmbH.

Examples of the polyphenylene ether compound include a polyphenylene ether compound represented by the following Formula (8) and a polyphenylene ether compound represented by the following Formula (9). As the polyphenylene ether compound, these polyphenylene ether compounds may be used singly or these two kinds of polyphenylene ether compounds may be used in combination.

[Chem. 8]

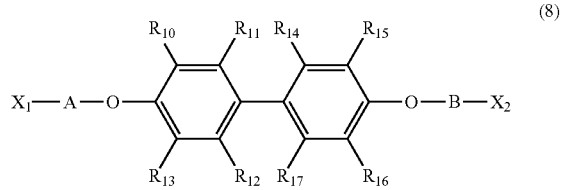

(8)

[Chem. 9]

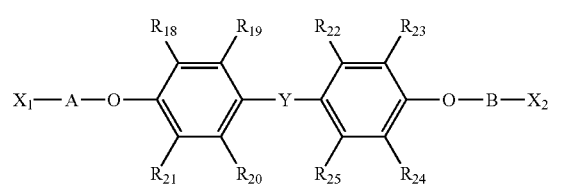

(9)

In Formulas (8) and (9), $R_{10}$ to $R_{17}$ and $R_{18}$ to $R_{25}$ each independently represent a hydrogen atom, an alkyl group, an alkenyl group, an alkynyl group, a formyl group, an alkylcarbonyl group, an alkenylcarbonyl group, or an alkynylcarbonyl group. $X_1$ and $X_2$ each independently represent a substituent having a carbon-carbon unsaturated double bond. A and B represent repeating units represented by the following Formulas (10) and (11), respectively. In Formula (9), Y represents a linear, branched, or cyclic hydrocarbon having 20 or less carbon atoms.

[Chem. 10]

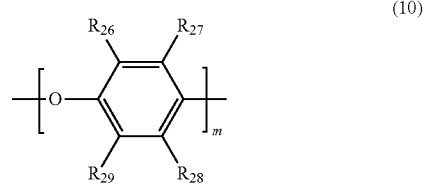

(10)

[Chem. 11]

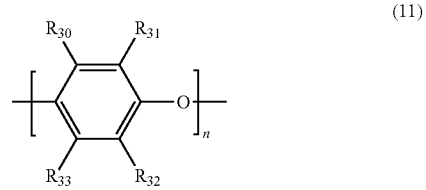

(11)

In Formulas (10) and (11), m and n each represent 0 to 20. $R_{26}$ to $R_{29}$ and $R_{30}$ to $R_{33}$ each independently represent a hydrogen atom, an alkyl group, an alkenyl group, an alkynyl group, a formyl group, an alkylcarbonyl group, an alkenylcarbonyl group, or an alkynylcarbonyl group.

The polyphenylene ether compound represented by Formula (8) and the polyphenylene ether compound represented by Formula (9) are not particularly limited as long as they are compounds satisfying the above configuration. Specifically, in Formulas (8) and (9), $R_{10}$ to $R_{17}$ and $R_{18}$ to $R_{25}$ are independent of each other as described above. In other words, $R_{10}$ to $R_{17}$ and $R_{18}$ to $R_{25}$ may be the same group as or different groups from each other. $R_{10}$ to $R_{17}$ and $R_{18}$ to $R_{25}$ represent a hydrogen atom, an alkyl group, an alkenyl group, an alkynyl group, a formyl group, an alkylcarbonyl group, an alkenylcarbonyl group, or an alkynylcarbonyl group. Among these, a hydrogen atom and an alkyl group are preferable.

In Formulas (10) and (11), m and n each preferably represent 0 to 20 as described above. In addition, it is preferable that m and n represent numerical values so that the sum of m and n is 1 to 30. Hence, it is more preferable that m represents 0 to 20, n represents 0 to 20, and the sum of m and n represents 1 to 30. $R_{26}$ to $R_{29}$ and $R_{30}$ to $R_{33}$ are independent of each other. In other words, $R_{26}$ to $R_{29}$ and $R_{30}$ to $R_{33}$ may be the same group as or different groups from each other. $R_{26}$ to $R_{29}$ and $R_{30}$ to $R_{33}$ represent a hydrogen atom, an alkyl group, an alkenyl group, an alkynyl group, a formyl group, an alkylcarbonyl group, an alkenylcarbonyl group, or an alkynylcarbonyl group. Among these, a hydrogen atom and an alkyl group are preferable.

$R_{10}$ to $R_{33}$ are the same as $R_6$ to $R_9$ in Formula (7).

In Formula (9), Y represents a linear, branched, or cyclic hydrocarbon having 20 or less carbon atoms as described above. Examples of Y include a group represented by the following Formula (12).

[Chem. 12]

In Formula (12), $R_{34}$ and $R_{35}$ each independently represent a hydrogen atom or an alkyl group. Examples of the alkyl group include a methyl group. Examples of the group represented by Formula (12) include a methylene group, a methylmethylene group, and a dimethylmethylene group. Among these, a dimethylmethylene group is preferable.

In Formulas (8) and (9), $X_1$ and $X_2$ each independently represent a substituent having an unsaturated double bond. The substituents $X_1$ and $X_2$ are not particularly limited as long as they are substituents having an unsaturated double bond. Examples of the substituents $X_1$ and $X_2$ include a substituent represented by Formula (4) and a substituent represented by Formula (5). In the polyphenylene ether compound represented by Formula (8) and the polyphenylene ether compound represented by Formula (9), $X_1$ and $X_2$ may be the same substituent as or different substituents from each other.

More specific examples of the polyphenylene ether compound represented by Formula (8) include a polyphenylene ether compound represented by the following Formula (13).

[Chem. 13]

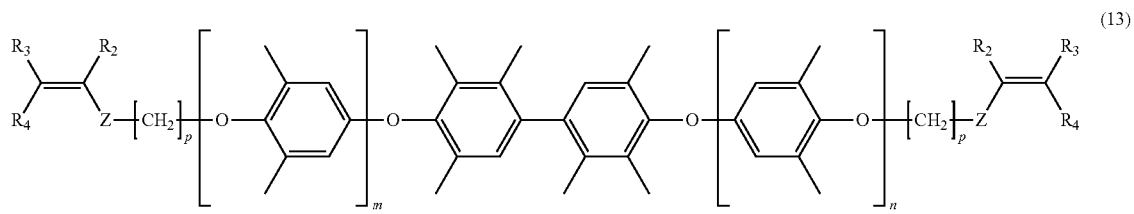

More specific examples of the polyphenylene ether compound represented by Formula (9) include a polyphenylene ether compound represented by the following Formula (14) and a polyphenylene ether compound represented by the following Formula (15).

[Chem. 14]

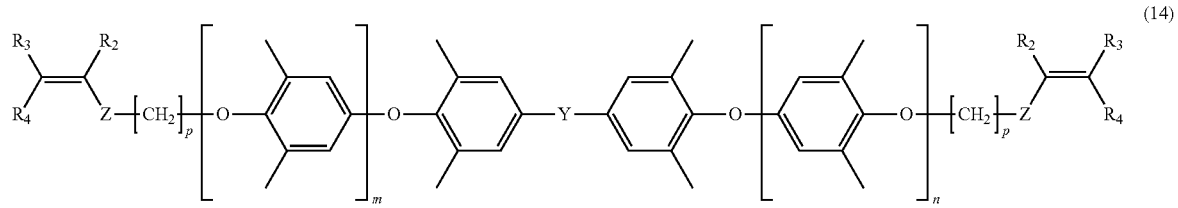

[Chem. 15]

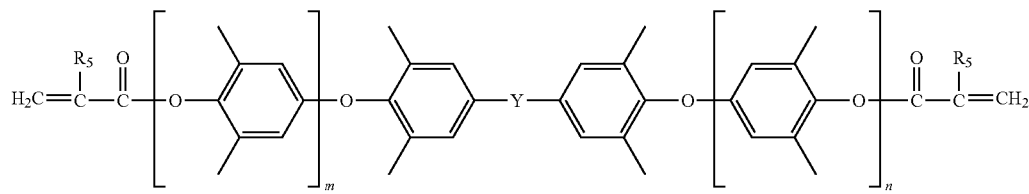

(15)

In Formulas (13) to (15), m and n are the same as m and n in Formulas (10) and (11). In Formulas (13) and (14), $R_2$ to $R_4$, p, and Z are the same as $R_2$ to $R_4$, p, and Z in Formula (4). In Formulas (14) and (15), Y is the same as Y in Formula (9). In Formula (15), $R_5$ is the same as $R_4$ in Formula (5).

The method for synthesizing the polyphenylene ether compound to be used in the present embodiment is not particularly limited as long as a polyphenylene ether compound having an unsaturated double bond in the molecule can be synthesized. Here, a method for synthesizing a modified polyphenylene ether compound of which the terminal is modified with a substituent having an unsaturated double bond will be described. Specific examples of the method include a method in which polyphenylene ether is reacted with a compound in which a substituent having an unsaturated double bond is bonded to a halogen atom.

Examples of the compound in which a substituent having an unsaturated double bond is bonded to a halogen atom include compounds in which substituents represented by Formulas (4) to (6) are bonded to a halogen atom. Specific examples of the halogen atom include a chlorine atom, a bromine atom, an iodine atom, and a fluorine atom. Among these, a chlorine atom is preferable. More specific examples of the compound in which a substituent having an unsaturated double bond is bonded to a halogen atom include o-chloromethylstyrene, p-chloromethylstyrene, and m-chloromethylstyrene. The compound in which a substituent having an unsaturated double bond is bonded to a halogen atom may be used singly or in combination of two or more kinds thereof. For example, o-chloromethylstyrene, p-chloromethylstyrene, and m-chloromethylstyrene may be used singly or in combination of two or three kinds thereof.

Polyphenylene ether which is a raw material is not particularly limited as long as a predetermined modified polyphenylene ether compound can be finally synthesized. Specific examples thereof include those containing polyphenylene ether containing 2,6-dimethylphenol and at least one of a bifunctional phenol and a trifunctional phenol and polyphenylene ether such as poly(2,6-dimethyl-1,4-phenylene oxide) as a main component. In addition, the bifunctional phenol is a phenol compound having two phenolic hydroxyl groups in the molecule, and examples thereof include tetramethyl bisphenol A. In addition, the trifunctional phenol is a phenol compound having three phenolic hydroxyl groups in the molecule.

Examples of the method for synthesizing the modified polyphenylene ether compound include the methods described above. Specifically, polyphenylene ether as described above and a compound in which a substituent having an unsaturated double bond is bonded to a halogen atom are dissolved in a solvent and stirred. By doing so, polyphenylene ether reacts with the compound in which a substituent having a carbon-carbon unsaturated double bond is bonded to a halogen atom, and the modified polyphenylene ether compound to be used in the present embodiment is obtained.

The reaction is preferably conducted in the presence of an alkali metal hydroxide. By doing so, it is considered that this reaction suitably proceeds. This is considered to be because the alkali metal hydroxide functions as a dehydrohalogenating agent, specifically, a dehydrochlorinating agent. In other words, it is considered that the alkali metal hydroxide eliminates the hydrogen halide from the phenol group in polyphenylene ether and the compound in which a substituent having a carbon-carbon unsaturated double bond is bonded to a halogen atom, and by doing so, the substituent having a carbon-carbon unsaturated double bond is bonded to the oxygen atom of the phenol group instead of the hydrogen atom of the phenol group in the polyphenylene ether.

The alkali metal hydroxide is not particularly limited as long as it can act as a dehalogenating agent, and examples thereof include sodium hydroxide. In addition, the alkali metal hydroxide is usually used in the form of an aqueous solution and is specifically used as an aqueous sodium hydroxide solution.

The reaction conditions such as reaction time and reaction temperature also vary depending on the compound in which a substituent having a carbon-carbon unsaturated double bond is bonded to a halogen atom and the like, and are not particularly limited as long as they are conditions under which the reaction as described above suitably proceeds. Specifically, the reaction temperature is preferably room temperature to 100° C. and more preferably 30° C. to 100° C. In addition, the reaction time is preferably 0.5 to 20 hours and more preferably 0.5 to 10 hours.

The solvent to be used at the time of the reaction is not particularly limited as long as it can dissolve polyphenylene ether and the compound in which a substituent having a carbon-carbon unsaturated double bond is bonded to a halogen atom, and does not inhibit the reaction of polyphenylene ether with the compound in which a substituent having a carbon-carbon unsaturated double bond is bonded to a halogen atom. Specific examples thereof include toluene.

The above reaction is preferably conducted in the presence of not only an alkali metal hydroxide but also a phase transfer catalyst. In other words, the above reaction is preferably conducted in the presence of an alkali metal hydroxide and a phase transfer catalyst. By doing so, it is considered that the above reaction more suitably proceeds. This is considered to be due to the following. This is considered to be because the phase transfer catalyst is a catalyst which has a function of taking in the alkali metal hydroxide, is soluble in both phases of a phase of a polar solvent such as water and a phase of a non-polar solvent such as an organic solvent, and can transfer between these phases. Specifically, in a case where an aqueous sodium hydroxide solution is used as an alkali metal hydroxide and an organic solvent, such as toluene, which is incompatible with water is used as a solvent, it is considered that even when the aqueous sodium hydroxide solution is dropped into the solvent subjected to the reaction, the solvent and the aqueous sodium hydroxide solution are separated from each other and the sodium hydroxide is hardly transferred to the solvent. In that case, it is considered that the aqueous sodium hydroxide solution added as an alkali metal hydroxide hardly contributes to the promotion of the reaction. In contrast, when the reaction is conducted in the presence of an alkali metal hydroxide and a phase transfer catalyst, it is considered that the alkali metal hydroxide is transferred to the solvent in the state of being taken in the phase transfer catalyst and the aqueous sodium hydroxide solution is likely to contribute to the promotion of the reaction. For this reason, when the reaction is conducted in the presence of an alkali metal hydroxide and a phase transfer catalyst, it is considered that the above reaction more suitably proceeds.

The phase transfer catalyst is not particularly limited, and examples thereof include quaternary ammonium salts such as tetra-n-butylammonium bromide.

The resin composition to be used in the present embodiment preferably contains a modified polyphenylene ether compound obtained as described above as the polyphenylene ether compound.

(Phosphorus-Containing Compound)

The phosphorus-containing compound is not particularly limited as long as it is a phosphorus-containing compound having a group represented by Formula (1) and a group containing a phosphorus atom in the molecule.

As described above, $R_1$ in the group represented by Formula (I) is a hydrogen atom or an alkyl group. Examples of the alkyl group include alkyl groups having 1 to 5 carbon atoms, and specific examples thereof include a methyl group, an ethyl group, a propyl group, an isopropyl group, an n-butyl group, a sec-butyl group, an isobutyl group, a tert-butyl group, a pentyl group, and a neopentyl group. Among these, a hydrogen atom and a methyl group are preferable, and a methyl group is more preferable. In other words, the group represented by Formula (1) is preferably an acryloyl group or a methacryloyl group, more preferably a methacryloyl group.

The group containing a phosphorus atom is not particularly limited as long as it contains a phosphorus atom. Examples of the group containing a phosphorus atom include a phosphoric acid group, a phosphoryl group, a group represented by the following Formula (2), a group represented by the following Formula (16), and a group represented by the following Formula (17), and it is preferable to include a group represented by the following Formula (2) among these.

[Chem. 16]

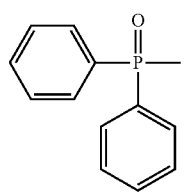

(2)

[Chem. 17]

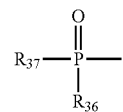

(16)

In Formula (16), $R_{36}$ and $R_{37}$ each independently represent an alkyl group. Examples of the alkyl group include a methyl group, an ethyl group, a propyl group, an isopropyl group, an n-butyl group, a sec-butyl group, an isobutyl group, a tert-butyl group, a pentyl group, and a neopentyl group, and an ethyl group is preferable among these.

[Chem. 18]

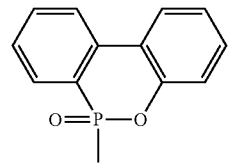

(17)

The group containing a phosphorus atom may be bonded to the group represented by Formula (1) directly or indirectly (via another atom or the like). In a case where the group containing a phosphorus atom is indirectly bonded to the group represented by Formula (1), the group containing a phosphorus atom and the group represented by Formula (1) may be bonded to, for example, a carbon atom or an oxygen atom.

Examples of the phosphorus-containing compound having a group represented by Formula (2) include a compound represented by the following Formula (18).

[Chem. 19]

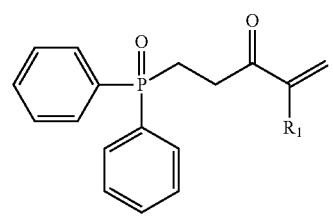

(18)

In Formula (18), $R_1$ represents a hydrogen atom or an alkyl group as in Formula (1). Examples of the alkyl group include alkyl groups having 1 to 5 carbon atoms, and specific examples thereof include a methyl group, an ethyl group, a propyl group, an isopropyl group, an n-butyl group, a sec-butyl group, an isobutyl group, a tert-butyl group, a pentyl group, and a neopentyl group. Among these, $R_1$ is preferably a hydrogen atom and a methyl group, more preferably a methyl group. In other words, the phosphorus-containing compound is preferably (methacryloylmethyl) diphenylphosphine oxide.

(Curing Agent)

The curing agent is a curing agent capable of reacting with the maleimide compound and the polyphenylene ether compound and curing a resin composition containing the maleimide compound and the polyphenylene ether compound. The curing agent is not particularly limited as long as it is a curing agent capable of curing a resin composition containing the maleimide compound and the polyphenylene ether compound. Examples of the curing agent include styrene, styrene derivatives, a compound having an acryloyl group in the molecule, a compound having a methacryloyl group in the molecule, a compound having a vinyl group in the molecule, a compound having an allyl group in the molecule, a compound having an acenaphthylene structure in the molecule, and an isocyanurate compound having an isocyanurate group in the molecule.

Examples of the styrene derivatives include bromostyrene and dibromostyrene.

The compound having an acryloyl group in the molecule is an acrylate compound. Examples of the acrylate compound include a monofunctional acrylate compound having one acryloyl group in the molecule and a polyfunctional acrylate compound having two or more acryloyl groups in the molecule. Examples of the monofunctional acrylate compound include methyl acrylate, ethyl acrylate, propyl acrylate, and butyl acrylate. Examples of the polyfunctional acrylate compound include diacrylate compounds such as tricyclodecanedimethanol diacrylate.

The compound having a methacryloyl group in the molecule is a methacrylate compound. Examples of the methacrylate compound include a monofunctional methacrylate compound having one methacryloyl group in the molecule and a polyfunctional methacrylate compound having two or more methacryloyl groups in the molecule. Examples of the monofunctional methacrylate compound include methyl methacrylate, ethyl methacrylate, propyl methacrylate, and butyl methacrylate. Examples of the polyfunctional methacrylate compound include dimethacrylate compounds such as tricyclodecanedimethanol dimethacrylate.

The compound having a vinyl group in the molecule is a vinyl compound. Examples of the vinyl compound include a monofunctional vinyl compound (monovinyl compound) having one vinyl group in the molecule and a polyfunctional vinyl compound having two or more vinyl groups in the molecule. Examples of the polyfunctional vinyl compound include divinylbenzene and polybutadiene.

The compound having an allyl group in the molecule is an allyl compound. Examples of the allyl compound include a monofunctional allyl compound having one allyl group in the molecule and a polyfunctional allyl compound having two or more allyl groups in the molecule. Examples of the polyfunctional allyl compound include a triallyl isocyanurate compound, a diallyl bisphenol compound, and diallyl phthalate (DAP).

The compound having an acenaphthylene structure in the molecule is an acenaphthylene compound. Examples of the acenaphthylene compound include acenaphthylene, alkylacenaphthylenes, halogenated acenaphthylenes, and phenylacenaphthylenes. Examples of the alkyl acenaphthylenes include 1-methyl acenaphthylene, 3-methyl acenaphthylene, 4-methyl acenaphthylene, 5-methyl acenaphthylene, 1-ethyl acenaphthylene, 3-ethyl acenaphthylene, 4-ethyl acenaphthylene, and 5-ethyl acenaphthylene. Examples of the halogenated acenaphthylenes include 1-chloroacenaphthylene, 3-chloroacenaphthylene, 4-chloroacenaphthylene, 5-chloroacenaphthylene, 1-bromoacenaphthylene, 3-bromoacenaphthylene, 4-bromoacenaphthylene, and 5-bromoacenaphthylene. Examples of the phenylacenaphthylenes include 1-phenylacenaphthylene, 3-phenylacenaphthylene, 4-phenylacenaphthylene, and 5-phenylacenaphthylene. The acenaphthylene compound may be a monofunctional acenaphthylene compound having one acenaphthylene structure in the molecule as described above or may be a polyfunctional acenaphthylene compound having two or more acenaphthylene structures in the molecule.

The compound having an isocyanurate group in the molecule is an isocyanurate compound. Examples of the isocyanurate compound include a compound having an alkenyl group in the molecule (alkenyl isocyanurate compound), and examples thereof include a trialkenyl isocyanurate compound such as triallyl isocyanurate (TAIL).

Among the above, the curing agent is, for example, an allyl compound having an allyl group in the molecule, a polyfunctional acrylate compound having two or more acryloyl groups in the molecule, and a polyfunctional methacrylate compound having two or more methacryloyl groups in the molecule. As the curing agent, it is preferable to contain the allyl compound, and more preferable to contain the allyl compound and further a curing agent other than the allyl compound. As the curing agent other than the allyl compound, at least one of a polyfunctional acrylate compound and a polyfunctional methacrylate compound is preferable. In other words, as the curing agent, it is more preferable to contain the allyl compound and further at least one of a polyfunctional acrylate compound and a polyfunctional methacrylate compound. As the allyl compound, a triallyl isocyanurate compound and a diallyl bisphenol compound are preferable. As the polyfunctional methacrylate compound, a dimethacrylate compound is preferable. In a case where the curing agent contains the allyl compound and further a curing agent other than the allyl compound, the content of the allyl compound is preferably 50 to 99 parts by mass, more preferably 60 to 85 parts by mass with respect to 100 parts by mass of the curing agent (sum of the allyl compound and a curing agent other than the allyl compound).

As the curing agent, the above curing agents may be used singly or in combination of two or more kinds thereof.

The weight average molecular weight of the curing agent is not particularly limited and is, for example, preferably 100 to 5000, more preferably 100 to 4000, still more preferably 100 to 3000. When the weight average molecular weight of the curing agent is too low, the curing agent may easily volatilize from the compounding component system of the resin composition. When the weight average molecular weight of the curing agent is too high, the viscosity of the varnish of the resin composition and the melt viscosity at the time of heat molding may be too high. Hence, a resin composition imparting superior heat resistance to the cured product is obtained when the weight average molecular weight of the curing agent is within such a range. It is considered that this is because the resin composition containing the polyphenylene ether compound can be suitably cured by the reaction of the curing agent with the polyphenylene ether compound. Note that the weight average molecular weight here may be measured by a general molecular weight measurement method, and specific examples thereof include a value measured by gel permeation chromatography (GPC).

With regard to the curing agent, the average number (number of functional groups) of the functional groups which contribute to the reaction of the curing agent with the maleimide compound and the polyphenylene ether compound per one molecule of the curing agent varies depending on the weight average molecular weight of the curing agent, but is, for example, preferably 1 to 20, more preferably 2 to 18. When this number of functional groups is too small, sufficient heat resistance of the cured product tends to be hardly attained. When the number of functional groups is too large, the reactivity is too high and, for example, troubles such as a decrease in the storage stability of the resin composition or a decrease in the fluidity of the resin composition may occur.

(Content)

The content of the phosphorus-containing compound is preferably 2 to 20 parts by mass, more preferably 2 to 15 parts by mass, still more preferably 3 to 12 parts by mass with respect to 100 parts by mass of the sum of the maleimide compound, the polyphenylene ether compound, and the curing agent. The content of the maleimide compound is preferably 10 to 75 parts by mass, more preferably 20 to 65 parts by mass, still more preferably 30 to 50 parts by mass with respect to 100 parts by mass of the sum of the maleimide compound, the polyphenylene ether compound, and the curing agent. The content of the polyphenylene ether compound is preferably 10 to 75 parts by mass, more preferably 20 to 60 parts by mass, still more preferably 30 to 50 parts by mass with respect to 100 parts by mass of the sum of the maleimide compound, the polyphenylene ether compound, and the curing agent. The content of the curing agent is preferably 10 to 45 parts by mass, more preferably 15 to 40 parts by mass, still more preferably 20 to 35 parts by mass with respect to 100 parts by mass of the sum of the maleimide compound, the polyphenylene ether compound, and the curing agent. When the contents of the phosphorus-containing compound, the maleimide compound, the polyphenylene ether compound, and the curing agent are in the above ranges, there is obtained a resin composition which exhibits excellent moldability and suitably provides a cured product having a high glass transition temperature, low water absorbing property, sufficiently suppressed increases in dielectric constant and dielectric loss tangent due to water absorption even after water absorption, and superior flame retardancy.

(Other Components)

The resin composition according to the present embodiment may contain components (other components) other than the phosphorus-containing compound, the maleimide compound, the polyphenylene ether compound, and the curing agent if necessary as long as the effects of the present invention are not impaired. As other components to be contained in the resin composition according to the present embodiment, for example, additives such as a silane coupling agent, an initiator, an antifoaming agent, an antioxidant, a heat stabilizer, an antistatic agent, an ultraviolet absorber, a dye or a pigment, a lubricant, and a filler may be further contained. The resin composition may contain thermosetting resins such as an epoxy resin, an unsaturated polyester resin, and a thermosetting polyimide resin in addition to the polyphenylene ether compound.

As described above, the resin composition according to the present embodiment may contain a silane coupling agent. The silane coupling agent may be contained in the resin composition or may be contained as a silane coupling agent covered on the inorganic filler to be contained in the resin composition for surface treatment in advance. Among these, it is preferable that the silane coupling agent is contained as a silane coupling agent covered on the inorganic filler for surface treatment in advance, and it is more preferable that the silane coupling agent is contained as a silane coupling agent covered on the inorganic filler for surface treatment in advance and further is also contained in the resin composition. Moreover, in the case of a prepreg, the silane coupling agent may be contained in the prepreg as a silane coupling agent covered on the fibrous base material for surface treatment in advance.

Examples of the silane coupling agent include a silane coupling agent having at least one functional group selected from the group consisting of a vinyl group, a styryl group, a methacryloyl group, an acryloyl group, and a phenylamino group. In other words, examples of this silane coupling agent include compounds having at least one of a vinyl group, a styryl group, a methacryloyl group, an acryloyl group, or a phenylamino group as a reactive functional group, and further a hydrolyzable group such as a methoxy group or an ethoxy group.

Examples of the silane coupling agent include vinyltriethoxysilane and vinyltrimethoxysilane as those having a vinyl group. Examples of the silane coupling agent include p-styryltrimethoxysilane and p-styryltriethoxysilane as those having a styryl group. Examples of the silane coupling agent include 3-methacryloxypropyltrimethoxysilane, 3-methacryloxypropylmethyldimethoxysilane, 3-methacryloxypropyltriethoxysilane, 3-methacryloxypropylmethyldiethoxysilane, and 3-methacryloxypropylethyldiethoxysilane as those having a methacryloyl group. Examples of the silane coupling agent include 3-acryloxypropyltrimethoxysilane and 3-acryloxypropyltriethoxysilane as those having an acryloyl group. Examples of the silane coupling agent include N-phenyl-3-aminopropyltrimethoxysilane and N-phenyl-3-aminopropyltriethoxysilane as those having a phenylamino group.

As described above, the resin composition according to the present embodiment may contain a flame retardant other than the phosphorus-containing compound. In other words, the flame retardancy of the cured product of the resin composition can be enhanced by concurrently using a flame retardant other than the phosphorus-containing compound with the phosphorus-containing compound. The flame retardant is not particularly limited. Specifically, in the field in which halogen-based flame retardants such as bromine-based flame retardants are used, for example, ethylenedipentabromobenzene, ethylenebistetrabromoimide, decabromodiphenyloxide, and tetradecabromodiphenoxybenzene which have a melting point of 300° C. or more are preferable. It is considered that the elimination of halogen at a high temperature and the deterioration in heat resistance can be suppressed by the use of a halogen-based flame retardant. In addition, in the field of being required to be free of halogen, a phosphoric ester-based flame retardant, a phosphazene-based flame retardant, a bis(diphenylphosphine oxide)-based flame retardant, and a phosphinate-based flame retardant are exemplified. Specific examples of the phosphoric ester-based flame retardant include phosphoric ester compounds such as a condensed phosphoric ester including dixylenyl phosphate and a condensed aromatic phosphoric ester compound. Specific examples of the phosphazene-based flame retardant include phenoxyphosphazene. Specific examples of the bis(diphenylphosphine oxide)-based flame retardant include xylylenebis(diphenylphosphine oxide). Specific examples of the phosphinate-based flame retardant include metal phosphinates such as aluminum dialkyl phosphinate and phosphinate compounds such as aluminum tris(diethylphosphinate). As the flame retardant, the respective flame retardants exemplified may be used singly or in combination of two or more kinds thereof.

As described above, the resin composition according to the present embodiment may contain an initiator (reaction initiator). The curing reaction can proceed even though the resin composition does not contain a reaction initiator. However, a reaction initiator may be added since there is a case where it is difficult to raise the temperature until curing proceeds depending on the process conditions. The reaction initiator is not particularly limited as long as it can promote the curing reaction of the modified polyphenylene ether compound with the curing agent. Specific examples thereof include oxidizing agents such as α,α'-bis(t-butylperoxy-m-isopropyl)benzene, 2,5-dimethyl-2,5-di(t-butylperoxy)-3-hexyne, benzoyl peroxide, 3,3',5,5'-tetramethyl-1,4-diphenoquinone, chloranil, 2,4,6-tri-t-butylphenoxyl, t-butylperoxyisopropyl monocarbonate, and azobisisobutyronitrile. Moreover, a metal carboxylate can be concurrently used if necessary. By doing so, the curing reaction can be further promoted. Among these, α,α'-bis(t-butylperoxy-m-isopropyl)benzene is preferably used. α,α'-bis(t-butylperoxy-m-isopropyl)benzene has a relatively high reaction initiation temperature and thus can suppress the promotion of the curing reaction at the time point at which curing is not required, for example, at the time of prepreg drying, and can suppress a decrease in the storage stability of the polyphenylene ether resin composition. Furthermore, α,α'-bis(t-butylperoxy-m-isopropyl)benzene exhibits low volatility, thus does not volatilize at the time of prepreg drying and storage, and exhibits favorable stability. In addition, the reaction initiator may be used singly or in combination of two or more kinds thereof.

As described above, the resin composition according to the present embodiment may contain a filler such as an inorganic filler. Examples of the filler include those to be added to enhance the heat resistance and flame retardancy of a cured product of the resin composition, but the filler is not particularly limited. In addition, the heat resistance, flame retardancy and the like can be further enhanced by containing a filler. Specific examples of the filler include silica such as spherical silica, metal oxides such as alumina, titanium oxide, and mica, metal hydroxides such as aluminum hydroxide and magnesium hydroxide, talc, aluminum borate, barium sulfate, and calcium carbonate. In addition, as the filler, silica, mica, and talc are preferable and spherical silica is more preferable among these. In addition, the filler may be used singly or in combination of two or more kinds thereof. In addition, the filler may be used as it is, or a filler subjected to a surface treatment with the silane coupling agent may be used. In addition, in a case where a filler is contained, the content thereof (filler content) is preferably 30% to 270% by mass and more preferably 50% to 250% by mass with respect to the resin composition.

(Production Method)

The method for producing the resin composition is not particularly limited, and examples thereof include a method in which the phosphorus-containing compound, the maleimide compound, the polyphenylene ether compound, and the curing agent are mixed together so as to have predetermined contents. Specific examples thereof include the method to be described later in the case of obtaining a varnish-like composition containing an organic solvent.

Moreover, by using the resin composition according to the present embodiment, a prepreg, a metal-clad laminate, a wiring board, a metal foil with resin, and a film with resin can be obtained as described below.

[Prepreg]

FIG. 1 is a schematic sectional view illustrating an example of a prepreg 1 according to an embodiment of the present invention.

As illustrated in FIG. 1, the prepreg 1 according to the present embodiment includes the resin composition or a semi-cured product 2 of the resin composition and a fibrous base material 3. This prepreg 1 includes the resin composition or the semi-cured product 2 of the resin composition and the fibrous base material 3 present in the resin composition or the semi-cured product 2 of the resin composition.

In the present embodiment, the semi-cured product is in a state in which the resin composition has been cured to an extent that the resin composition can be further cured. In other words, the semi-cured product is in a state in which the resin composition has been semi-cured (B-staged). For example, when the resin composition is heated, the viscosity gradually decreases at the beginning, then curing starts, and the viscosity gradually increases. In such a case, the semi-cured state includes a state in which the viscosity has started to increase but curing is not completed, and the like.

In addition, the prepreg to be obtained using the resin composition according to the present embodiment may include a semi-cured product of the resin composition as described above or include the uncured resin composition itself. In other words, the prepreg may be a prepreg including a semi-cured product of the resin composition (the B-stage resin composition) and a fibrous base material or a prepreg including the resin composition before being cured (the A-stage resin composition) and a fibrous base material. The resin composition or a semi-cured product of the resin composition may be one obtained by drying or heating and drying the resin composition.

When manufacturing a prepreg, the resin composition 2 is often prepared in a varnish form and used in order to be impregnated into the fibrous base material 3 which is a base material for forming the prepreg. In other words, the resin composition 2 is usually a resin varnish prepared in a varnish form in many cases. Such a varnish-like resin composition (resin varnish) is prepared, for example, as follows.

First, the respective components which can be dissolved in an organic solvent are introduced into and dissolved in an organic solvent. At this time, heating may be performed if necessary. Thereafter, components which are used if necessary but are not dissolved in the organic solvent are added to and dispersed in the solution until a predetermined dispersion state is achieved using a ball mill, a bead mill, a planetary mixer, a roll mill or the like, whereby a varnish-like resin composition is prepared. The organic solvent to be used here is not particularly limited as long as it dissolves the maleimide compound, the polyphenylene ether compound, the curing agent and the like and does not inhibit the curing reaction. Specific examples thereof include toluene and methyl ethyl ketone (MEK).

The method for manufacturing the prepreg is not particularly limited as long as the prepreg can be manufactured. Specifically, when manufacturing a prepreg, the resin composition which has been described above and is used in the present embodiment is often prepared in a varnish form and used as a resin varnish as described above.

Specific examples of the fibrous base material include glass cloth, aramid cloth, polyester cloth, a glass nonwoven fabric, an aramid nonwoven fabric, a polyester nonwoven fabric, pulp paper, and linter paper. When glass cloth is used, a laminate exhibiting excellent mechanical strength is obtained, and glass cloth subjected to flattening is particularly preferable. Specific examples of the flattening include a method in which glass cloth is continuously pressed at an appropriate pressure using a press roll to flatly compress the yarn. The thickness of the generally used fibrous base material is, for example, 0.01 mm or more and 0.3 mm or less.

The method for manufacturing the prepreg is not particularly limited as long as the prepreg can be manufactured. Specifically, when manufacturing a prepreg, the resin composition according to the present embodiment described above is often prepared in a varnish form and used as a resin varnish as described above.

Examples of the method for manufacturing the prepreg 1 include a method in which the fibrous base material 3 is impregnated with the resin composition 2, for example, the resin composition 2 prepared in a varnish form, and then dried. The fibrous base material 3 is impregnated with the resin composition 2 by dipping, coating, and the like. If necessary, the impregnation can be repeated a plurality of times. Moreover, at this time, it is also possible to finally adjust the composition and impregnated amount to the desired composition and impregnated amount by repeating impregnation using a plurality of resin compositions having different compositions and concentrations.

The fibrous base material 3 impregnated with the resin composition (resin varnish) 2 is heated under desired heating conditions, for example, at 80° C. or more and 180° C. or less for 1 minute or more and 10 minutes or less. By heating, the prepreg 1 before being cured (A-stage) or in a semi-cured state (B-stage) is obtained. By the heating, the organic solvent can be decreased or removed by being volatilized from the resin varnish.

The resin composition according to the present embodiment is a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. For this reason, a prepreg including this resin composition or a semi-cured product of this resin composition is a prepreg which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. From this prepreg, a wiring board can be suitably manufactured which includes an insulating layer having a high glass transition temperature, excellent flame retardancy, low water absorbing property, and sufficiently suppressed increases in dielectric constant and dielectric loss tangent due to water absorption even after water absorption.

[Metal-Clad Laminate]

Figure 2:
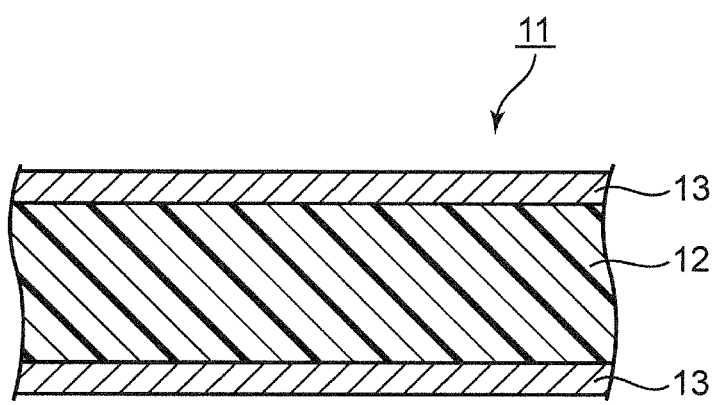
FIG. 2 is a schematic sectional view illustrating an example of a metal-clad laminate according to the embodiment of the present invention.

FIG. 2 is a schematic sectional view illustrating an example of a metal-clad laminate 11 according to an embodiment of the present invention.

As illustrated in FIG. 2, the metal-clad laminate 11 includes an insulating layer 12 containing a cured product of the prepreg 1 illustrated in FIG. 1 and a metal foil 13 to be laminated together with the insulating layer 12. In other words, the metal-clad laminate 11 includes the insulating layer 12 containing a cured product of a resin composition and the metal foil 13 provided on the insulating layer 12. In addition, the insulating layer 12 may be formed of a cured product of the resin composition or a cured product of the prepreg. In addition, the thickness of the metal foil 13 varies depending on the performance and the like to be required for the finally obtained wiring board and is not particularly limited. The thickness of the metal foil 13 can be appropriately set depending on the desired purpose and is preferably, for example, 0.2 to 70 μm. Moreover, examples of the metal foil 13 include a copper foil and an aluminum foil, and the metal foil 13 may be a copper foil with carrier which includes a release layer and a carrier for the improvement in handleability in a case where the metal foil is thin.

The method for manufacturing the metal-clad laminate 11 is not particularly limited as long as the metal-clad laminate 11 can be manufactured. Specific examples thereof include a method in which the metal-clad laminate 11 is fabricated using the prepreg 1. Examples of this method include a method in which the double-sided metal foil-clad or single-sided metal foil-clad laminate 11 is fabricated by stacking one sheet or a plurality of sheets of prepreg 1, further stacking the metal foil 13 such as a copper foil on both or one of upper and lower surfaces of the prepregs 1, and laminating and integrating the metal foils 13 and prepregs 1 by heating and pressing. In other words, the metal-clad laminate 11 is obtained by laminating the metal foil 13 on the prepreg 1 and then performing heating and pressing. Moreover, the heating and pressing conditions can be appropriately set depending on the thickness of the metal-clad laminate 11 to be manufactured, the kind of the composition of the prepreg 1, and the like. For example, it is possible to set the temperature to 170° C. to 210° C., the pressure to 3.5 to 4 MPa, and the time to 60 to 150 minutes. Moreover, the metal-clad laminate may be manufactured without using a prepreg. Examples thereof include a method in which a varnish-like resin composition is applied on a metal foil to form a layer containing the resin composition on the metal foil and then heating and pressing is performed.

The resin composition according to the present embodiment is a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. For this reason, a metal-clad laminate including an insulating layer containing a cured product of this resin composition is a metal-clad laminate including an insulating layer suitably fainted of a cured product having a high glass transition temperature, excellent flame retardancy, low water absorbing property, and sufficiently suppressed increases in dielectric constant and dielectric loss tangent due to water absorption even after water absorption. From this metal-clad laminate, a wiring board can be suitably manufactured which includes an insulating layer having a high glass transition temperature, excellent flame retardancy, low water absorbing property, and sufficiently suppressed increases in dielectric constant and dielectric loss tangent due to water absorption even after water absorption.

[Wiring Board]

Figure 3:
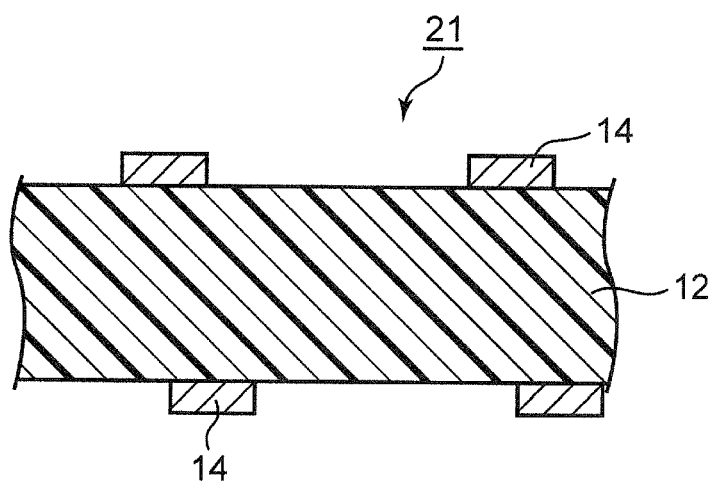
FIG. 3 is a schematic sectional view illustrating an example of a wiring board according to the embodiment of the present invention.

FIG. 3 is a schematic sectional view illustrating an example of a wiring board 21 according to an embodiment of the present invention.

The wiring board 21 according to the present embodiment is formed of an insulating layer 12 obtained by curing the prepreg 1 illustrated in FIG. 1 and wiring 14 which is laminated together with the insulating layer 12 and is formed by partially removing the metal foil 13 as illustrated in FIG. 3. In other words, the wiring board 21 includes the insulating layer 12 containing a cured product of a resin composition and the wiring 14 provided on the insulating layer 12. In addition, the insulating layer 12 may be formed of a cured product of the resin composition or a cured product of the prepreg.

The method for manufacturing the wiring board 21 is not particularly limited as long as the wiring board 21 can be manufactured. Specific examples thereof include a method in which the wiring board 21 is fabricated using the prepreg 1. Examples of this method include a method in which the wiring board 21, in which wiring is provided as a circuit on the surface of the insulating layer 12, is fabricated by forming wiring through etching and the like of the metal foil 13 on the surface of the metal-clad laminate 11 fabricated in the manner described above. In other words, the wiring board 21 is obtained by partially removing the metal foil 13 on the surface of the metal-clad laminate 11 and thus forming a circuit. In addition, examples of the method for forming a circuit include circuit formation by a semi-additive process (SAP) or a modified semi-additive process (MSAP) in addition to the method described above. The wiring board 21 includes the insulating layer 12 having a high glass transition temperature, excellent flame retardancy, low water absorbing property, and sufficiently suppressed increases in dielectric constant and dielectric loss tangent due to water absorption even after water absorption.

Such a wiring board is a wiring board including an insulating layer suitably formed of a cured product having a high glass transition temperature, excellent flame retardancy, low water absorbing property, and sufficiently suppressed increases in dielectric constant and dielectric loss tangent due to water absorption even after water absorption.

[Metal Foil with Resin]

Figure 4:
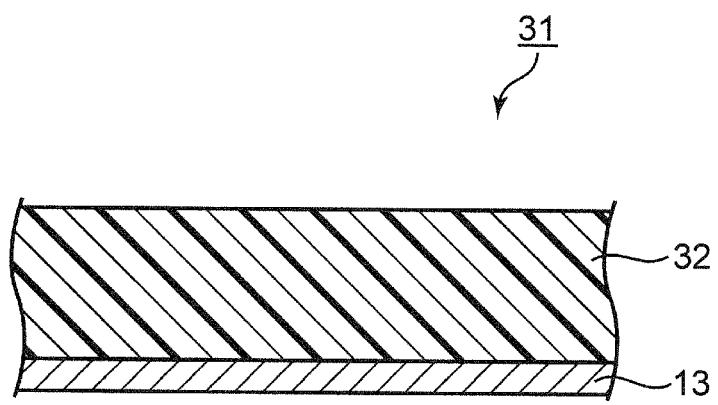
FIG. 4 is a schematic sectional view illustrating an example of a metal foil with resin according to the embodiment of the present invention.

FIG. 4 is a schematic sectional view illustrating an example of a metal foil with resin 31 according to the present embodiment.

The metal foil with resin 31 according to the present embodiment includes a resin layer 32 containing the resin composition or a semi-cured product of the resin composition and a metal foil 13 as illustrated in FIG. 4. The metal foil with resin 31 includes the metal foil 13 on the surface of the resin layer 32. In other words, the metal foil with resin 31 includes the resin layer 32 and the metal foil 13 to be laminated together with the resin layer 32. Moreover, the metal foil with resin 31 may include other layers between the resin layer 32 and the metal foil 13.

In addition, the resin layer 32 may contain a semi-cured product of the resin composition as described above or may contain the uncured resin composition. In other words, the metal foil with resin 31 may be a metal foil with resin including a resin layer containing a semi-cured product of the resin composition (the B-stage resin composition) and a metal foil or a metal foil with resin including a resin layer containing the resin composition before being cured (the A-stage resin composition) and a metal foil. Moreover, the resin layer only needs to contain the resin composition or a semi-cured product of the resin composition and may or may not contain a fibrous base material. The resin composition or a semi-cured product of the resin composition may be one obtained by drying or heating and drying the resin composition. In addition, as the fibrous base material, those similar to the fibrous base materials of the prepreg can be used.

Moreover, as the metal foil, metal foils to be used in metal-clad laminates can be used without being limited. Examples of the metal foil include a copper foil and an aluminum foil.

The metal foil with resin 31 and a film with resin 41 may include a cover film and the like if necessary. By including a cover film, it is possible to prevent entry of foreign matter and the like. The cover film is not particularly limited, and examples thereof include a polyolefin film, a polyester film, a polymethylpentene film, and films formed by providing a release agent layer on these films.

The method for manufacturing the metal foil with resin 31 is not particularly limited as long as the metal foil with resin 31 can be manufactured. Examples of the method for manufacturing the metal foil with resin 31 include a method in which the varnish-like resin composition (resin varnish) is applied on the metal foil 13 and heated to manufacture the metal foil with resin 31. The varnish-like resin composition is applied on the metal foil 13 using, for example, a bar coater. The applied resin composition is heated under the conditions of, for example, 80° C. or more and 180° C. or less and 1 minute or more and 10 minutes or less. The heated resin composition is formed as the uncured resin layer 32 on the metal foil 13. By the heating, the organic solvent can be decreased or removed by being volatilized from the resin varnish.

The resin composition according to the present embodiment is a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. For this reason, a metal foil with resin including a resin layer containing this resin composition or a semi-cured product of this resin composition is a metal foil with resin including a resin layer which suitably provides a cured product having a high glass transition temperature, excellent flame retardancy, low water absorbing property, and sufficiently suppressed increases in dielectric constant and dielectric loss tangent due to water absorption even after water absorption. This metal foil with resin can be used when a wiring board is suitably manufactured which includes an insulating layer having a high glass transition temperature, excellent flame retardancy, low water absorbing property, and sufficiently suppressed increases in dielectric constant and dielectric loss tangent due to water absorption even after water absorption. For example, by laminating the metal foil with resin on a wiring board, a multilayer wiring board can be manufactured. As a wiring board obtained using such a metal foil with resin, there is obtained a wiring board including an insulating layer suitably formed of a cured product having a high glass transition temperature, excellent flame retardancy, low water absorbing property, and sufficiently suppressed increases in dielectric constant and dielectric loss tangent due to water absorption even after water absorption.

[Film with Resin]

Figure 5:
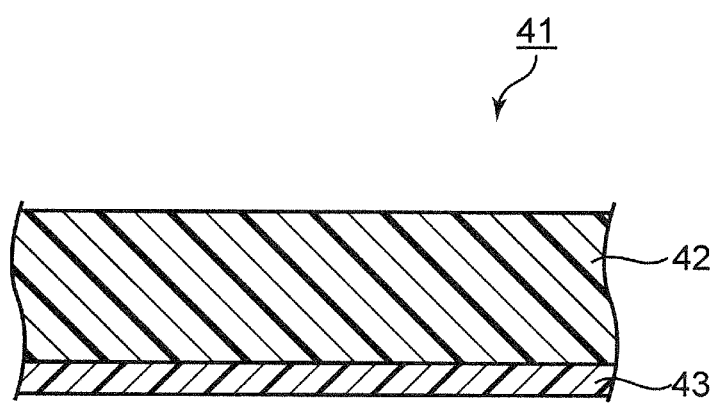
FIG. 5 is a schematic sectional view illustrating an example of a film with resin according to the embodiment of the present invention.

FIG. 5 is a schematic sectional view illustrating an example of a film with resin 41 according to the present embodiment.

The film with resin 41 according to the present embodiment includes a resin layer 42 containing the resin composition or a semi-cured product of the resin composition and a support film 43 as illustrated in FIG. 5. The film with resin 41 includes the resin layer 42 and the support film 43 to be laminated together with the resin layer 42. Moreover, the film with resin 41 may include other layers between the resin layer 42 and the support film 43.

In addition, the resin layer 42 may contain a semi-cured product of the resin composition as described above or may contain the uncured resin composition. In other words, the film with resin 41 may be a film with resin including a resin layer containing a semi-cured product of the resin composition (the B-stage resin composition) and a support film or a film with resin including a resin layer containing the resin composition before being cured (the A-stage resin composition) and a support film. Moreover, the resin layer only needs to contain the resin composition or a semi-cured product of the resin composition and may or may not contain a fibrous base material. The resin composition or a semi-cured product of the resin composition may be one obtained by drying or heating and drying the resin composition. In addition, as the fibrous base material, those similar to the fibrous base materials of the prepreg can be used.

Moreover, as the support film 43, support films to be used in films with resin can be used without being limited. Examples of the support film include electrically insulating films such as a polyester film, a polyethylene terephthalate (PET) film, a polyimide film, a polyparabanic acid film, a polyether ether ketone film, a polyphenylene sulfide film, a polyamide film, a polycarbonate film, and a polyarylate film.

The film with resin 41 may include a cover film and the like if necessary. By including a cover film, it is possible to prevent entry of foreign matter and the like. The cover film is not particularly limited, and examples thereof include a polyolefin film, a polyester film, and a polymethylpentene film.

The support film and the cover film may be those subjected to surface treatments such as a matt treatment, a corona treatment, a release treatment, and a roughening treatment if necessary.

The method for manufacturing the film with resin 41 is not particularly limited as long as the film with resin 41 can be manufactured. Examples of the method for manufacturing the film with resin 41 include a method in which the varnish-like resin composition (resin varnish) is applied on the support film 43 and heated to manufacture the film with resin 41. The varnish-like resin composition is applied on the support film 43 using, for example, a bar coater. The applied resin composition is heated under the conditions of, for example, 80° C. or more and 180° C. or less and 1 minute or more and 10 minutes or less. The heated resin composition is formed as the uncured resin layer 42 on the support film 43. By the heating, the organic solvent can be decreased or removed by being volatilized from the resin varnish.

The resin composition according to the present embodiment is a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. For this reason, a film with resin including a resin layer containing this resin composition or a semi-cured product of this resin composition is a film with resin including a resin layer which suitably provides a cured product having a high glass transition temperature, excellent flame retardancy, low water absorbing property, and sufficiently suppressed increases in dielectric constant and dielectric loss tangent due to water absorption even after water absorption. This film with resin can be used when a wiring board is suitably manufactured which includes an insulating layer having a high glass transition temperature, excellent flame retardancy, low water absorbing property, and sufficiently suppressed increases in dielectric constant and dielectric loss tangent due to water absorption even after water absorption. A multilayer wiring board can be manufactured, for example, by laminating the film with resin on a wiring board and then peeling off the support film from the film with resin or by peeling off the support film from the film with resin and then laminating the film with resin on a wiring board. As a wiring board obtained using such a film with resin, there is obtained a wiring board including an insulating layer suitably formed of a cured product having a high glass transition temperature, excellent flame retardancy, low water absorbing property, and sufficiently suppressed increases in dielectric constant and dielectric loss tangent due to water absorption even after water absorption.

The present specification discloses various aspects of a technology as described above, but the main technology is summarized below.

An aspect of the present invention is a resin composition containing a maleimide compound, a polyphenylene ether compound having an unsaturated double bond in the molecule, a phosphorus-containing compound having a group represented by the following Formula (1) and a group containing a phosphorus atom in the molecule, and a curing agent.

[Chem. 20]

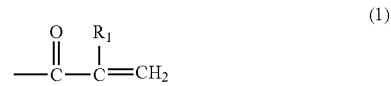

(1)

In Formula (1), $R_1$ represents a hydrogen atom or an alkyl group.

According to such a configuration, it is possible to provide a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption.

This is considered to be due to the following.

First, it is considered that a cured product which has a high glass transition temperature and maintains the excellent low dielectric properties of polyphenylene ether is obtained from the resin composition by curing the polyphenylene ether compound together with the maleimide compound and the curing agent. It is considered that as the resin composition contains the polyphenylene ether compound, the maleimide compound, and the curing agent, the resin composition can be suitably cured and a cured product is obtained which has low water absorbing property and sufficiently suppressed increases in the dielectric constant and dielectric loss tangent due to water absorption even after water absorption. In other words, it is considered that the resin composition can provide a cured product, which can suitably maintain the excellent low dielectric properties of the polyphenylene ether even after water absorption.

It is considered that the flame retardancy can be enhanced as the resin composition contains the phosphorus-containing compound. There is a tendency that even a compound other than the phosphorus-containing compound can enhance the flame retardancy as long as it is a compound containing phosphorus in the molecule. With regard to this, it is considered that the phosphorus-containing compound has not only a group containing a phosphorus atom but also a group represented by Formula (1) in the molecule, and can be thus bonded to the polyphenylene ether compound and the like when the resin composition is cured. It is considered that this makes it possible to effectively enhance the flame retardancy of the cured product. In order to allow the cured product to exert sufficient flame retardancy with a compound containing phosphorus in the molecule other than the phosphorus-containing compound, it is required to increase the content of this compound, and the moldability of the resin composition tends to deteriorate in this case. With regard to this point, it is considered that the flame retardancy of the cured product can be sufficiently enhanced while the deterioration of the moldability of the resin composition is suppressed with the phosphorus-containing compound since the flame retardancy can be enhanced with a relatively small amount of the phosphorus-containing compound.

From the above, the resin composition having the above configuration exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption.

In the resin composition, it is preferable that the group containing a phosphorus atom includes a group represented by the following Formula (2).

[Chem. 21]

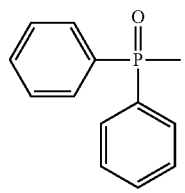

(2)

According to such a configuration, there is obtained a resin composition which exhibits excellent moldability and suitably provides a cured product having a high glass transition temperature, low water absorbing property, sufficiently suppressed increases in dielectric constant and dielectric loss tangent due to water absorption even after water absorption, and superior flame retardancy.

In the resin composition, it is preferable that the curing agent contains an allyl compound. It is preferable that the allyl compound includes at least one of a triallyl isocyanurate compound and a diallyl bisphenol compound.

According to such a configuration, there is obtained a resin composition which exhibits excellent moldability and suitably provides a cured product exhibiting excellent flame retardancy, low water absorbing property, sufficiently suppressed increases in dielectric constant and dielectric loss tangent due to water absorption even after water absorption, and superior heat resistance such as a high glass transition temperature.

In the resin composition, it is preferable that the curing agent further contains at least one of a polyfunctional acrylate compound and a polyfunctional methacrylate compound. In other words, it is preferable that the curing agent contains at least one of a polyfunctional acrylate compound and a polyfunctional methacrylate compound, and an allyl compound. It is preferable that the polyfunctional methacrylate compound includes a dimethacrylate compound.

According to such a configuration, there is obtained a resin composition which exhibits excellent moldability and suitably provides a cured product having a high glass transition temperature, excellent flame retardancy, low water absorbing property, sufficiently suppressed increases in dielectric constant and dielectric loss tangent due to water absorption even after water absorption, and excellent adhesive property to a metal foil and the like.

In the resin composition, it is preferable that the content of the phosphorus-containing compound is preferably 2 to 20 parts by mass with respect to 100 parts by mass of the sum of the maleimide compound, the polyphenylene ether compound, and the curing agent.

According to such a configuration, there is obtained a resin composition which exhibits excellent moldability and suitably provides a cured product having a high glass transition temperature, low water absorbing property, sufficiently suppressed increases in dielectric constant and dielectric loss tangent due to water absorption even after water absorption, and superior flame retardancy.

In the resin composition, it is preferable that the content of the maleimide compound is 10 to 75 parts by mass with respect to 100 parts by mass of the sum of the maleimide compound, the polyphenylene ether compound, and the curing agent.

According to such a configuration, there is obtained a resin composition which exhibits excellent moldability and suitably provides a cured product having a high glass transition temperature, low water absorbing property, sufficiently suppressed increases in dielectric constant and dielectric loss tangent due to water absorption even after water absorption, and superior flame retardancy.

In addition, another aspect of the present invention is a prepreg including the resin composition or a semi-cured product of the resin composition, and a fibrous base material.

According to such a configuration, it is possible to provide a prepreg which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption.

In addition, another aspect of the present invention is a film with resin including a resin layer containing the resin composition or a semi-cured product of the resin composition, and a support film.

According to such a configuration, it is possible to provide a film with resin including a resin layer which suitably provides a cured product having a high glass transition temperature, excellent flame retardancy, low water absorbing property, and sufficiently suppressed increases in dielectric constant and dielectric loss tangent due to water absorption even after water absorption.

In addition, another aspect of the present invention is a metal foil with resin including a resin layer containing the resin composition or a semi-cured product of the resin composition, and a metal foil.

According to such a configuration, it is possible to provide a metal foil with resin including a resin layer which suitably provides a cured product having a high glass transition temperature, excellent flame retardancy, low water absorbing property, and sufficiently suppressed increases in dielectric constant and dielectric loss tangent due to water absorption even after water absorption.

In addition, another aspect of the present invention is a metal-clad laminate including an insulating layer containing a cured product of the resin composition or a cured product of the prepreg, and a metal foil.

According to such a configuration, it is possible to provide a metal-clad laminate including an insulating layer suitably formed of a cured product having a high glass transition temperature, excellent flame retardancy, low water absorbing property, and sufficiently suppressed increases in dielectric constant and dielectric loss tangent due to water absorption even after water absorption.

In addition, another aspect of the present invention is a wiring board including an insulating layer containing a cured product of the resin composition or a cured product of the prepreg, and wiring.

According to such a configuration, it is possible to provide a wiring board including an insulating layer suitably formed of a cured product having a high glass transition temperature, excellent flame retardancy, low water absorbing property, and sufficiently suppressed increases in dielectric constant and dielectric loss tangent due to water absorption even after water absorption.

According to the present invention, it is possible to provide a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. In addition, according to the present invention, a prepreg, a film with resin, a metal foil with resin, a metal-clad laminate, and a wiring board which are obtained using the resin composition are provided.

Hereinafter, the present invention will be described more specifically with reference to examples, but the scope of the present invention is not limited thereto.

EXAMPLES

Examples 1 to 8 and Comparative Examples 1 to 5

The respective components to be used when preparing a resin composition in the present examples will be described.
(Maleimide Compound)
MIR-3000-70MT: Maleimide compound represented by Formula (3), where $R_A$, $R_B$, $R_C$, and $R_D$ are a hydrogen atom (MIR-3000-70MT manufactured by Nippon Kayaku Co., Ltd.)
BMI2300: Polyphenylmethanemaleimide (BMI2300 manufactured by Daiwa Kasei Industry Co., Ltd.)
(Polyphenylene ether compound: PPE)
PPE-1: Polyphenylene ether compound having a vinylbenzyl group (ethenylbenzyl group) at the terminal (OPE-2st 1200 manufactured by MITSUBISHI GAS CHEMICAL COMPANY, INC., Mn: 1200, a polyphenylene ether compound represented by Formula (13), where Z is a phenylene group, $R_2$ to $R_4$ are a hydrogen atom, and p is 1)
PPE-2: Polyphenylene ether compound having a methacryloyl group at the terminal (a modified polyphenylene ether obtained by modifying the terminal hydroxyl groups of polyphenylene ether with a methacryloyl group, a modified polyphenylene ether compound represented by Formula (15), where Y is a dimethylmethylene group (a group represented by Formula (12), where $R_{34}$ and $R_{35}$ are a methyl group), SA9000 manufactured by SABIC Innovative Plastics, weight average molecular weight Mw: 2000, number of terminal functional groups: 2)
(Curing agent: allyl compound)
TRIC: Triallyl isocyanurate (TAIC manufactured by Nihon Kasei CO., LTD.)
DABPA: 2,2'-Diallylbisphenol A (2,2'-diallyl-4,4'-isopropylidene diphenol, DABPA manufactured by Daiwa Kasei Industry Co., Ltd.)
(Curing agent: dimethacrylate compound)
DCP: Tricyclodecane dimethanol dimethacrylate (NK Ester DCP manufactured by Shin-Nakamura Chemical Co., Ltd.)
(Phosphorus-containing compound and flame retardant)
MC-4: (Methacryloylmethyl)diphenylphosphine oxide (MC-4 manufactured by KATAYAMA CHEMICAL INDUSTRIES Co., Ltd.: phosphorus-containing compound: a compound represented by Formula (18), where $R_1$ is a methyl group)

OP-935: Aluminum tris(diethylphosphinate) (Exolit OP-935 manufactured by Clariant AG: flame retardant (phosphinate compound) other than the phosphorus-containing compound: phosphorus concentration 23% by mass)
PX-200: Condensed aromatic phosphoric ester compound (PX-200 manufactured by DAIHACHI CHEMICAL INDUSTRY CO., LTD.: flame retardant (phosphoric ester compound) other than the phosphorus-containing compound: phosphorus concentration 9% by mass)
(Filler)
SC2500-SXJ: Silica particles subjected to a surface treatment with a silane coupling agent having a phenylamino group in the molecule (SC2500-SXJ manufactured by Admatechs Company Limited)
(Preparation Method)
First, the respective components other than the filler were added to and mixed in methyl ethyl ketone (MEK) at the composition (parts by mass) shown in Table 1 so that the solid concentration was 70% by mass. The mixture was stirred for 60 minutes. Thereafter, the filler was added to and dispersed in the obtained liquid using a bead mill. By doing so, a varnish-like resin composition (varnish) was obtained.

Next, an evaluation substrate (cured product of prepreg) was obtained as follows.

Next, the obtained varnish was impregnated into a fibrous base material (glass cloth: #1080 type, E Glass manufactured by Asahi Kasei Corporation) and then heated and dried at 130° C. for about 3 to 8 minutes, thereby fabricating a prepreg. At that time, the content (resin content) of the components constituting the resin with respect to the prepreg was adjusted to be about 70% by mass by the curing reaction. Thereafter, eight sheets of each obtained prepreg were stacked and heated to a temperature of 220° C. at a rate of temperature rise of 4° C./min and heated and pressed under the conditions of 220° C., 90 minutes, and a pressure of 4 MPa, thereby obtaining an evaluation substrate (cured product of prepreg).

Next, an evaluation substrate (metal-clad laminate) was obtained as follows.

Two sheets of the obtained respective prepregs were superposed, and copper foil (FV-WS manufactured by The Furukawa Electric Co., Ltd., thickness: 18 μm) was disposed on both sides of the laminate. This as a body to be pressurized was heated and pressurized for 2 hours under the conditions of a temperature of 200° C. and a pressure of 3 MPa to obtain an evaluation substrate (metal-clad laminate) in which copper foil was attached to both surfaces.

The prepreg, evaluation substrate (cured product of prepreg), and evaluation substrate (metal-clad laminate) prepared as described above were evaluated by the methods described below.
[Glass Transition Temperature (Tg)]
The Tg of the prepreg was measured using a viscoelastic spectrometer "DMS6100" manufactured by Seiko Instruments Inc. At this time, a dynamic viscoelasticity measurement (DMA) was performed at a bending module by setting the frequency to 10 Hz, and the temperature at which tan δ was the maximum when the temperature was raised from room temperature to 320° C. under the condition of a rate of temperature rise of 5° C./min was defined as Tg. When Tg is higher than 320° C., Tg is denoted as ">320" in Table 1.
[Peel Strength]
The copper foil was peeled off from the evaluation substrate (metal-clad laminate), and the peel strength at that time was measured in conformity with JIS C6481. Specifically, the insulating layer (prepreg) on the uppermost surface of the evaluation substrate was peeled off at a speed of 50 mm/min using a tensile tester, and the peel strength (N/mm) at that time was measured.

[Water Absorption Rate]

The water absorption rate (%) of the evaluation substrate (cured product of prepreg) was measured by a method conforming to IPC-TM-650 2.6.2.1.

[Dielectric Properties (Relative Dielectric Constant and Dielectric Loss Tangent)]

The relative dielectric constant and dielectric loss tangent of the evaluation substrate (cured product of prepreg) at 1 GHz were measured by a method conforming to IPC-TM650-2.5.5.9. Specifically, the relative dielectric constant and dielectric loss tangent of the evaluation substrate at 1 GHz were measured using an impedance analyzer (RF Impedance Analyzer HP4291B manufactured by Agilent Technologies, Inc.). The relative dielectric constant and dielectric loss tangent were measured before and after the evaluation substrate absorbed water.

The difference between the relative dielectric constant after water absorption and the relative dielectric constant before water absorption and the difference between the dielectric loss tangent after water absorption and the dielectric loss tangent before water absorption were calculated.

[Moldability]

A 100 mm×100 mm prepreg provided with a rectangular (30 mm×30 mm) hole in the center was prepared. This prepreg was sandwiched between plates using a triacetyl cellulose (TAC) film as a release film. In other words, the prepreg was sandwiched between TAC films, and the prepreg sandwiched between TAC films was sandwiched between plates. The prepreg sandwiched between plates was heated and pressurized for 15 minutes under the condition of a pressure of 1380±70 kPa using a pressing machine for laminate molding set at 171±2.6° C. Thereafter, the heated and pressurized prepreg was cooled to room temperature and visually observed.

As a result, the moldability was evaluated as "Good" when the area of the hole, which is due to the hole formed in the prepreg before heating and pressurization and thus existed in the heated and pressurized prepreg, namely, the hole remaining after heating and pressurization of the prepreg provided with the hole was less than 20 mm$^2$, and the moldability was evaluated as "Poor" when the area of the hole existing in the heated and pressurized prepreg was 20 mm$^2$ or more.

[Flame Retardancy]

A test piece having a length of 125 mm and a width of 12.5 mm was cut out from the evaluation substrate (cured product of prepreg). Thereafter, the test piece was subjected to a combustion test in conformity with the "Test for Flammability of Plastic Materials-UL 94" of Underwriters Laboratories, and the flammability was evaluated. As a result, the flammability is denoted as "V-0" in Table 1 when being at the "V-0" level and as "V-1" when being at the "V-1" level.

The results of the respective evaluations are presented in Table 1. The "P content (% by mass) with respect to resin composition (excluding filler)" denotes the ratio (% by mass) of the mass of phosphorus atom (P) contained in the resin composition to the mass of the resin composition other than the filler.

TABLE 1

| | | | | Example | | | | | | | |
|---|---|---|---|---|---|---|---|---|---|---|---|
| | | | | 1 | 2 | 3 | 4 | 5 | 6 | 7 | 8 |
| Composition (parts by mass) | Maleimide compound | MIR-3000-70MT | | 30 | 30 | 30 | 10 | 60 | 30 | 30 | — |
| | | BMI2300 | | — | — | — | — | — | — | — | 30 |
| | PPE | PPE-1 | | 40 | 40 | 40 | 75 | 10 | 50 | — | 40 |
| | | PPE-2 | | — | — | — | — | — | — | 40 | — |
| | Curing agent | Allyl compound | TAIC | 20 | 20 | 20 | 5 | 10 | 20 | 20 | 20 |
| | | | DABPA | 5 | 5 | 5 | 5 | 10 | — | 5 | 10 |
| | | Dimethacrylate compound | DCP | 5 | 5 | 5 | 5 | 10 | — | 5 | — |
| | | MC-4 | | 12 | 3 | 18 | 12 | 12 | 12 | 12 | 12 |
| | | OP935 | | — | — | — | — | — | — | — | — |
| | | PX-200 | | — | — | — | — | — | — | — | — |
| | Filler | SC2500-SXJ | | 125 | 125 | 125 | 125 | 125 | 125 | 125 | 125 |
| P content (% by mass) with respect to resin composition (excluding filler) | | | | 1 | 0.25 | 1.5 | 1 | 1 | 1 | 1 | 1 |
| Evaluation | Glass transition temperature Tg (° C.) | | | 284 | 304 | 280 | 252 | >320 | 291 | 310 | >320 |
| | Peel strength (N/m) | | | 0.72 | 0.75 | 0.71 | 0.81 | 0.97 | 0.59 | 0.92 | 0.76 |
| | Water absorption rate (%) | | | 0.46 | 0.47 | 0.46 | 0.22 | 0.47 | 0.44 | 0.44 | 0.53 |
| | Before water absorption | Relative dielectric constant | | 3.60 | 3.65 | 3.62 | 3.50 | 3.62 | 3.65 | 3.60 | 3.62 |
| | | Dielectric loss tangent | | 0.0019 | 0.0016 | 0.0015 | 0.0024 | 0.0024 | 0.0020 | 0.0028 | 0.0032 |
| | After water absorption | Relative dielectric constant | | 3.80 | 3.82 | 3.79 | 3.59 | 3.80 | 3.80 | 3.67 | 3.80 |
| | | Dielectric loss tangent | | 0.0045 | 0.0042 | 0.0043 | 0.0040 | 0.0055 | 0.0045 | 0.0053 | 0.0072 |
| | Amount of change in relative dielectric constant (after water absorption − before water absorption) | | | 0.20 | 0.17 | 0.17 | 0.09 | 0.18 | 0.15 | 0.07 | 0.18 |
| | Amount of change in dielectric loss tangent (after water absorption − before water absorption) | | | 0.0026 | 0.0026 | 0.0028 | 0.0016 | 0.0031 | 0.0025 | 0.0025 | 0.0040 |
| | Moldability | | | Good | Good | Good | Good | Good | Good | Good | Good |
| | Flame retardancy | | | V-0 | V-0 | V-0 | V-0 | V-0 | V-0 | V-0 | V-0 |

TABLE 1-continued

|  |  |  |  | Comparative Example | | | | |
|---|---|---|---|---|---|---|---|---|
|  |  |  |  | 1 | 2 | 3 | 4 | 5 |
| Composition (parts by mass) | Maleimide compound | MIR-3000-70MT | | 30 | 30 | 30 | — | 70 |
| | | BMI2300 | | — | — | — | — | — |
| | PPE | PPE-1 | | 40 | 40 | 40 | 70 | — |
| | | PPE-2 | | — | — | — | — | — |
| | Curing agent | Allyl compound | TAIC | 20 | 20 | 20 | 20 | 20 |
| | | | DABPA | 5 | 5 | 5 | 10 | — |
| | | Dimethacrylate compound | DCP | 5 | 5 | 5 | — | — |
| | | MC-4 | | — | — | — | 12 | 12 |
| | | OP935 | | 12 | 5 | — | — | — |
| | | PX-200 | | — | — | 12 | — | — |
| | Filler | SC2500-SXJ | | 125 | 125 | 125 | 125 | 125 |
| P content (% by mass) with respect to resin composition (excluding filler) | | | | 2.4 | 1 | 0.9 | 1 | 1 |
| Evaluation | Glass transition temperature Tg (° C.) | | | 283 | 282 | 264 | 217 | >320 |
| | Peel strength (N/m) | | | 0.65 | 0.74 | 0.78 | 0.85 | 1.09 |
| | Water absorption rate (%) | | | 0.53 | 0.5 | 0.4 | 0.17 | 0.63 |
| | Before water absorption | Relative dielectric constant | | 3.62 | 3.64 | 3.64 | 3.59 | 3.77 |
| | | Dielectric loss tangent | | 0.0018 | 0.0019 | 0.0019 | 0.0030 | 0.0024 |
| | After water absorption | Relative dielectric constant | | 3.84 | 3.80 | 3.78 | 3.64 | 3.94 |
| | | Dielectric loss tangent | | 0.0049 | 0.0047 | 0.0034 | 0.0044 | 0.0069 |
| | Amount of change in relative dielectric constant (after water absorption − before water absorption) | | | 0.22 | 0.16 | 0.14 | 0.05 | 0.17 |
| | Amount of change in dielectric loss tangent (after water absorption − before water absorption) | | | 0.0031 | 0.0028 | 0.0015 | 0.0014 | 0.0045 |
| | Moldability | | | Poor | Good | Good | Good | Good |
| | Flame retardancy | | | V-0 | V-1 | V-1 | V-0 | V-0 |

As can be seen from Table 1, in the resin composition containing the maleimide compound, the polyphenylene ether compound, and the curing agent, the flame retardancy and the moldability were superior in the case of a resin composition further containing a phosphorus-containing compound having a group represented by Formula (1) and a group containing a phosphorus atom in the molecule (Examples 1 to 8) as compared to the case of containing a flame retardant other than the phosphorus-containing compound (Comparative Examples 1 to 3).

Tg was as high as 250° C. or more in the case of using the resin compositions according to Examples 1 to 8, and Tg in this case was even higher than that in the case of using a resin composition which does not contain the maleimide compound (Comparative Example 4).

The water absorption rate was as low as 0.6% or less in the case of using the resin compositions according to Examples 1 to 8, and the water absorption rate in this case was even lower than that in the case of using a resin composition which does not contain the polyphenylene ether compound (Comparative Example 5). In the case of using the resin compositions according to Examples 1 to 8, the relative dielectric constant and the dielectric loss tangent were low even after water absorption and the increases in the relative dielectric constant and dielectric loss tangent due to water absorption were also small. For example, in the case of using the resin compositions according to Examples 1 to 8, the amount of change in dielectric loss tangent due to water absorption was as low as 0.0040 or less, and was even lower than that in the case of using a resin composition which does not contain the polyphenylene ether compound (Comparative Example 5).

From the above, it has been found that a resin composition is obtained which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption by further containing a phosphorus-containing compound having a group represented by Formula (1) and a group containing a phosphorus atom in the molecule in the resin composition containing the maleimide compound, the polyphenylene ether compound, and the curing agent.

This application is based on Japanese Patent Application No. 2019-120081 filed on Jun. 27, 2019, the contents of which are included in the present application.

In order to express the present invention, the present invention has been described above appropriately and sufficiently through the embodiments. However, it should be recognized by those skilled in the art that changes and/or improvements of the above-described embodiments can be readily made. Accordingly, changes or improvements made by those skilled in the art shall be construed as being included in the scope of the claims unless otherwise the changes or improvements are at the level which departs from the scope of the appended claims.

INDUSTRIAL APPLICABILITY

According to the present invention, there is provided a resin composition which exhibits excellent moldability and suitably provides a cured product having a high glass transition temperature, excellent flame retardancy, low water absorbing property, and sufficiently suppressed increases in dielectric constant and dielectric loss tangent due to water absorption even after water absorption. In addition, according to the present invention, a prepreg, a film with resin, a metal foil with resin, a metal-clad laminate, and a wiring board which are obtained using the resin composition are provided.

The invention claimed is:

1. A resin composition comprising:
a maleimide compound represented by the following Formula (3);
a polyphenylene ether compound having an unsaturated double bond in a molecule;
a phosphorus-containing compound represented by the following Formula (18); and
a curing agent:

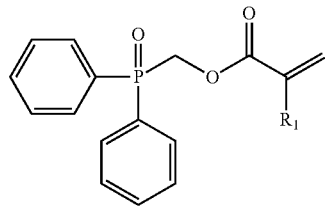

(18)

wherein in Formula (18), $R_1$ represents a methyl group;

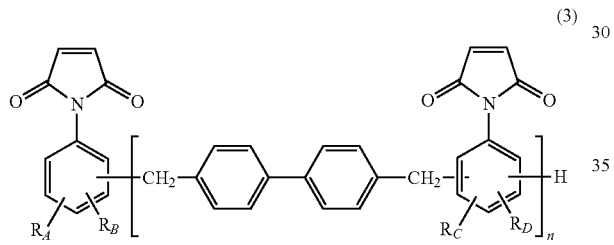

(3)

wherein in Formula (3), s represents 1 to 5 and $R_A$, $R_B$, $R_C$, and $R_D$ represent a hydrogen atom, wherein the curing agent contains at least one of a triallyl isocyanurate compound, a diallyl bisphenol compound, and tricyclodecanedimethanol dimethacrylate,
wherein a content of the maleimide compound is 10 to 75 parts by mass with respect to 100 parts by mass of the sum of the maleimide compound, the polyphenylene ether compound, and the curing agent, and
wherein a content of the phosphorus-containing compound is 2 to 20 parts by mass with respect to 100 parts by mass of a sum of the maleimide compound, the polyphenylene ether compound, and the curing agent.

2. A prepreg comprising:
the resin composition according to claim 1 or a semi-cured product of the resin composition; and
a fibrous base material.

3. A film with resin comprising:
a resin layer containing the resin composition according to claim 1 or a semi-cured product of the resin composition; and
a support film.

4. A metal foil with resin comprising:
a resin layer containing the resin composition according to claim 1 or a semi-cured product of the resin composition; and
a metal foil.

5. A metal-clad laminate comprising:
an insulating layer containing a cured product of the resin composition according to claim 1; and
a metal foil.

6. A wiring board comprising:
an insulating layer containing a cured product of the resin composition according to claim 1; and
wiring.

7. A metal-clad laminate comprising:
an insulating layer containing a cured product of the prepreg according to claim 2; and
a metal foil.

8. A wiring board comprising:
an insulating layer containing a cured product of the prepreg according to claim 2; and
wiring.

* * * * *